US012120045B2

(12) United States Patent
Taherzadeh Boroujeni et al.

(10) Patent No.: US 12,120,045 B2
(45) Date of Patent: Oct. 15, 2024

(54) TECHNIQUES FOR DYNAMICALLY APPLYING A REPETITION FACTOR FOR A BEAM

(71) Applicant: QUALCOMM Incorporated, San Diego, CA (US)

(72) Inventors: Mahmoud Taherzadeh Boroujeni, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/710,511

(22) Filed: Mar. 31, 2022

(65) Prior Publication Data

US 2022/0321286 A1    Oct. 6, 2022

Related U.S. Application Data

(60) Provisional application No. 63/170,166, filed on Apr. 2, 2021.

(51) Int. Cl.
*H04W 72/04* (2023.01)
*H04L 1/00* (2006.01)
(Continued)

(52) U.S. Cl.
CPC .......... *H04L 5/0023* (2013.01); *H04L 1/0013* (2013.01); *H04W 72/21* (2023.01)

(58) Field of Classification Search
None
See application file for complete search history.

(56) References Cited

U.S. PATENT DOCUMENTS

2018/0288746 A1\* 10/2018 Zhang ................... H04L 12/189
2019/0081739 A1    3/2019 Nammi
(Continued)

FOREIGN PATENT DOCUMENTS

WO    WO-2019135597 A1    7/2019

OTHER PUBLICATIONS

International Search Report and Written Opinion—PCT/US2022/023044—ISA/EPO—Jul. 19, 2022 (2103779WO).
(Continued)

*Primary Examiner* — Gary Lafontant
(74) *Attorney, Agent, or Firm* — Holland & Hart LLP

(57) ABSTRACT

Methods, systems, and devices for wireless communications are described. The techniques described herein support dynamically indicating uplink control channel repetition multiple different types of uplink signaling. A user equipment (UE) may receive first control signaling indicating a first repetition factor for transmission of a feedback message associated with a beam or transmission configuration indicator (TCI) state. The UE may receive second control signaling scheduling transmission of a control message associated with the beam or TCI state. The UE may transmit, in accordance with a second repetition factor, the control message based at least in part on both the feedback message and the control message being associated with the beam. In some cases, the second repetition factor may be configured with the second control signaling.

30 Claims, 15 Drawing Sheets

(51) Int. Cl.
*H04L 5/00* (2006.01)
*H04W 72/21* (2023.01)

(56) References Cited

U.S. PATENT DOCUMENTS

2019/0313342 A1 10/2019 Papasakellariou
2020/0259625 A1 8/2020 Papasakellariou

OTHER PUBLICATIONS

Qualcomm Incorporated: "PUCCH Coverage Enhancements", 3GPP TSG-RAN WG1 Meeting #104e, R1-2101480, 3rd Generation Partnership Project, Mobile Competence Centre, 650, Route Des Lucioles, F-06921 Sophia-Antipolis Cedex, France vol. RAN WG1, No. e-Meeting, Jan. 25, 2021-Feb. 5, 2021, 4 Pages, Jan. 19, 2021, XP051971645.

* cited by examiner

TECHNIQUES FOR DYNAMICALLY APPLYING A REPETITION FACTOR FOR A BEAM

CROSS REFERENCE

The present application for patent claims the benefit of U.S. Provisional Patent Application No. 63/170,166 by TAHERZADEH BOROUJENI et al., entitled "TECHNIQUES FOR DYNAMICALLY APPLYING A REPETITION FACTOR FOR A BEAM," filed Apr. 2, 2021, assigned to the assignee hereof, and expressly incorporated by reference herein.

FIELD OF TECHNOLOGY

The following relates to wireless communications, including techniques for dynamically applying a repetition factor for a beam.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for dynamically applying a repetition factor for a beam. Generally, the described techniques provide for dynamically indicating a repetition factor for uplink control signaling. A user equipment (UE) may be configured to transmit repetitions of an uplink control channel message, using multiple uplink control channel resources to transmit the repetitions. The UE may receive first control signaling which configures a first repetition factor associated with a feedback message (e.g., for a scheduled downlink data transmission). The UE may be configured to apply uplink control channel repetition to other uplink control messages which are associated with a same beam or transmission configuration indicator (TCI) state as the feedback message. For example, the UE may receive second control signaling scheduling the UE for another uplink control message, such as a periodic channel state information (CSI) report or feedback for semi-periodic shared channel transmissions. The UE may apply a second repetition factor to transmit the other uplink control message based on the first uplink repetition factor and the second control signaling scheduling the uplink control message.

A method for wireless communication at a UE is described. The method may include receiving first control signaling indicating a first repetition factor for transmission of a feedback message associated with a beam, receiving second control signaling scheduling transmission of a control message associated with the beam, and transmitting, in accordance with a second repetition factor, the control message based on both the feedback message and the control message being associated with the beam.

An apparatus for wireless communication at a UE is described. The apparatus may include a processor, memory coupled with the processor, and instructions stored in the memory. The instructions may be executable by the processor to cause the apparatus to receive first control signaling indicating a first repetition factor for transmission of a feedback message associated with a beam, receive second control signaling scheduling transmission of a control message associated with the beam, and transmit, in accordance with a second repetition factor, the control message based on both the feedback message and the control message being associated with the beam.

Another apparatus for wireless communication at a UE is described. The apparatus may include means for receiving first control signaling indicating a first repetition factor for transmission of a feedback message associated with a beam, means for receiving second control signaling scheduling transmission of a control message associated with the beam, and means for transmitting, in accordance with a second repetition factor, the control message based on both the feedback message and the control message being associated with the beam.

A non-transitory computer-readable medium storing code for wireless communication at a UE is described. The code may include instructions executable by a processor to receive first control signaling indicating a first repetition factor for transmission of a feedback message associated with a beam, receive second control signaling scheduling transmission of a control message associated with the beam, and transmit, in accordance with a second repetition factor, the control message based on both the feedback message and the control message being associated with the beam.

In some examples of the method, apparatuses, and non-transitory computer-readable medium described herein, receiving the first control signaling may include operations, features, means, or instructions for receiving the first control signaling including a bit field indicating the first repetition factor, where the control message may be transmitted in accordance with the second repetition factor based on the second control signaling and the bit field indicating the first repetition factor.

In some examples of the method, apparatuses, and non-transitory computer-readable medium described herein, receiving the first control signaling may include operations, features, means, or instructions for receiving the first control signaling including a physical uplink control channel resource indicator field indicating the first repetition factor, where the control message may be transmitted in accordance with the second repetition factor based on the second control signaling and the physical uplink control channel resource indicator field indicating the first repetition factor.

In some examples of the method, apparatuses, and non-transitory computer-readable medium described herein, transmitting the control message may include operations, features, means, or instructions for transmitting the control message in accordance with the second repetition factor based on a configuration indicating to apply the second repetition factor when the first control signaling may have a defined aggregation level.

In some examples of the method, apparatuses, and non-transitory computer-readable medium described herein, transmitting the control message may include operations, features, means, or instructions for transmitting the control message in accordance with the second repetition factor based on a configuration indicating to apply the second repetition factor when one or more control channel elements associated with the first control signaling correspond to a defined location.

In some examples of the method, apparatuses, and non-transitory computer-readable medium described herein, transmitting the control message may include operations, features, means, or instructions for transmitting, in accordance with the second repetition factor, the control message that may be a second feedback message associated with semi-persistently scheduled downlink shared channel resources.

In some examples of the method, apparatuses, and non-transitory computer-readable medium described herein, transmitting the control message may include operations, features, means, or instructions for transmitting, in accordance with the second repetition factor, the control message that may be a periodic CSI report.

In some examples of the method, apparatuses, and non-transitory computer-readable medium described herein, transmitting the control message may include operations, features, means, or instructions for transmitting, in accordance with the second repetition factor, the control message based on both the feedback message and the control message being associated with a same TCI state.

In some examples of the method, apparatuses, and non-transitory computer-readable medium described herein, transmitting the control message may include operations, features, means, or instructions for transmitting a set of multiple repetitions of the control message on a set of multiple uplink resources corresponding to the second repetition factor.

Some examples of the method, apparatuses, and non-transitory computer-readable medium described herein may further include operations, features, means, or instructions for receiving third control signaling scheduling transmission of a second control message associated with the beam, where the control message and the second control message may be different and transmitting, in accordance with the second repetition factor, the second control message based on both the feedback message and the second control message being associated with the beam.

Some examples of the method, apparatuses, and non-transitory computer-readable medium described herein may further include operations, features, means, or instructions for receiving third control signaling indicating the first repetition factor for transmission of a second feedback message associated with a second beam, the second feedback message indicating feedback for a second scheduled downlink data transmission, receiving fourth control signaling scheduling transmission of a second control message associated with the beam, and transmitting, without applying the second repetition factor, the second control message based on the second feedback message being associated with the second beam and the control message being associated with the beam.

In some examples of the method, apparatuses, and non-transitory computer-readable medium described herein, the control message may be transmitted in accordance with the second repetition factor based on a frequency range or subcarrier spacing, or both, associated with the control message.

In some examples of the method, apparatuses, and non-transitory computer-readable medium described herein, transmitting the control message may include operations, features, means, or instructions for transmitting the control message in accordance with the second repetition factor based on a configuration indicating to apply the second repetition factor when a downlink data channel transmission associated with the feedback message may be scheduled for transmission within a time interval.

In some examples of the method, apparatuses, and non-transitory computer-readable medium described herein, transmitting the control message may include operations, features, means, or instructions for transmitting, within a frequency range, the control message in accordance with the second repetition factor based on a configuration indicating to apply the second repetition factor within the frequency range.

In some examples of the method, apparatuses, and non-transitory computer-readable medium described herein, transmitting the control message may include operations, features, means, or instructions for transmitting, using a subcarrier spacing, the control message in accordance with the second repetition factor based on a configuration indicating to apply the second repetition factor for the subcarrier spacing.

In some examples of the method, apparatuses, and non-transitory computer-readable medium described herein, receiving the first control signaling may include operations, features, means, or instructions for receiving the first control signaling including a grant scheduling a scheduled downlink data transmission and transmitting, in accordance with the first repetition factor, the feedback message indicating feedback for the scheduled downlink data transmission.

A method for wireless communication at an access network entity is described. The method may include transmitting first control signaling indicating a first repetition factor for transmission of a feedback message associated with a beam, transmitting second control signaling scheduling transmission of a control message associated with the beam, and receiving, in accordance with a second repetition factor, the control message based on both the feedback message and the control message being associated with the beam.

An apparatus for wireless communication at an access network entity is described. The apparatus may include a processor, memory coupled with the processor, and instructions stored in the memory. The instructions may be executable by the processor to cause the apparatus to transmit first control signaling indicating a first repetition factor for transmission of a feedback message associated with a beam, transmit second control signaling scheduling transmission of a control message associated with the beam, and receive, in accordance with a second repetition factor, the control message based on both the feedback message and the control message being associated with the beam.

Another apparatus for wireless communication at an access network entity is described. The apparatus may include means for transmitting first control signaling indicating a first repetition factor for transmission of a feedback message associated with a beam, means for transmitting second control signaling scheduling transmission of a control message associated with the beam, and means for receiving, in accordance with a second repetition factor, the control message based on both the feedback message and the control message being associated with the beam.

A non-transitory computer-readable medium storing code for wireless communication at an access network entity is described. The code may include instructions executable by a processor to transmit first control signaling indicating a first repetition factor for transmission of a feedback message associated with a beam, transmit second control signaling scheduling transmission of a control message associated with the beam, and receive, in accordance with a second repetition factor, the control message based on both the feedback message and the control message being associated with the beam.

In some examples of the method, apparatuses, and non-transitory computer-readable medium described herein, transmitting the first control signaling may include operations, features, means, or instructions for transmitting the first control signaling including a bit field indicating the first repetition factor, where the control message may be received in accordance with the second repetition factor based on the second control signaling and the bit field indicating the first repetition factor.

In some examples of the method, apparatuses, and non-transitory computer-readable medium described herein, transmitting the first control signaling may include operations, features, means, or instructions for transmitting the first control signaling including a physical uplink control channel resource indicator field indicating the first repetition factor, where the control message may be received in accordance with the second repetition factor based on the second control signaling and the physical uplink control channel resource indicator field indicating the first repetition factor.

In some examples of the method, apparatuses, and non-transitory computer-readable medium described herein, receiving the control message may include operations, features, means, or instructions for receiving the control message in accordance with the second repetition factor based on a configuration indicating to apply the second repetition factor when the first control signaling may have a defined an aggregation level.

In some examples of the method, apparatuses, and non-transitory computer-readable medium described herein, receiving the control message may include operations, features, means, or instructions for receiving the control message in accordance with the second repetition factor based on a configuration indicating to apply the second repetition factor when one or more control channel elements associated with the first control signaling correspond to a defined location.

In some examples of the method, apparatuses, and non-transitory computer-readable medium described herein, receiving the control message may include operations, features, means, or instructions for receiving, in accordance with the second repetition factor, the control message that may be a second feedback message associated with semi-persistently scheduled downlink shared channel resources.

In some examples of the method, apparatuses, and non-transitory computer-readable medium described herein, receiving the control message may include operations, features, means, or instructions for receiving, in accordance with the second repetition factor, the control message that may be a periodic CSI report.

In some examples of the method, apparatuses, and non-transitory computer-readable medium described herein, receiving the control message may include operations, features, means, or instructions for receiving, in accordance with the second repetition factor, the control message based on both the feedback message and the control message being associated with a same TCI state.

In some examples of the method, apparatuses, and non-transitory computer-readable medium described herein, receiving the control message may include operations, features, means, or instructions for receiving a set of multiple repetitions of the control message on a set of multiple uplink resources corresponding to the second repetition factor.

Some examples of the method, apparatuses, and non-transitory computer-readable medium described herein may further include operations, features, means, or instructions for transmitting third control signaling scheduling transmission of a second control message associated with the beam, where the control message and the second control message may be different and receiving, in accordance with the second repetition factor, the second control message based on both the feedback message and the second control message being associated with the beam.

Some examples of the method, apparatuses, and non-transitory computer-readable medium described herein may further include operations, features, means, or instructions for transmitting third control signaling indicating the first repetition factor for transmission of a second feedback message associated with a second beam, the second feedback message indicating feedback for a second scheduled downlink data transmission, transmitting fourth control signaling scheduling transmission of a second control message associated with the beam, and receiving, without the second repetition factor being applied, the second control message based on the second feedback message being associated with the second beam and the control message being associated with the beam.

In some examples of the method, apparatuses, and non-transitory computer-readable medium described herein, the control message may be received in accordance with the second repetition factor based on a frequency range or subcarrier spacing, or both, associated with the control message.

In some examples of the method, apparatuses, and non-transitory computer-readable medium described herein, receiving the control message may include operations, features, means, or instructions for receiving the control message in accordance with the second repetition factor based on a configuration indicating to the second repetition factor may be applied when a downlink data channel transmission associated with the feedback message may be scheduled for transmission within a time interval.

In some examples of the method, apparatuses, and non-transitory computer-readable medium described herein, receiving the control message may include operations, features, means, or instructions for receiving, within a frequency range, the control message in accordance with the second repetition factor based on a configuration indicating the second repetition factor may be applied within the frequency range.

In some examples of the method, apparatuses, and non-transitory computer-readable medium described herein, receiving the control message may include operations, features, means, or instructions for receiving, using a subcarrier spacing, the control message in accordance with the second repetition factor based on a configuration indicating to apply the second repetition factor for the subcarrier spacing.

In some examples of the method, apparatuses, and non-transitory computer-readable medium described herein, transmitting the first control signaling may include operations, features, means, or instructions for transmitting the first control signaling including a grant scheduling a scheduled downlink data transmission and receiving, in accordance with the first repetition factor, the feedback message indicating feedback for the scheduled downlink data transmission.

DETAILED DESCRIPTION

Figure 1:
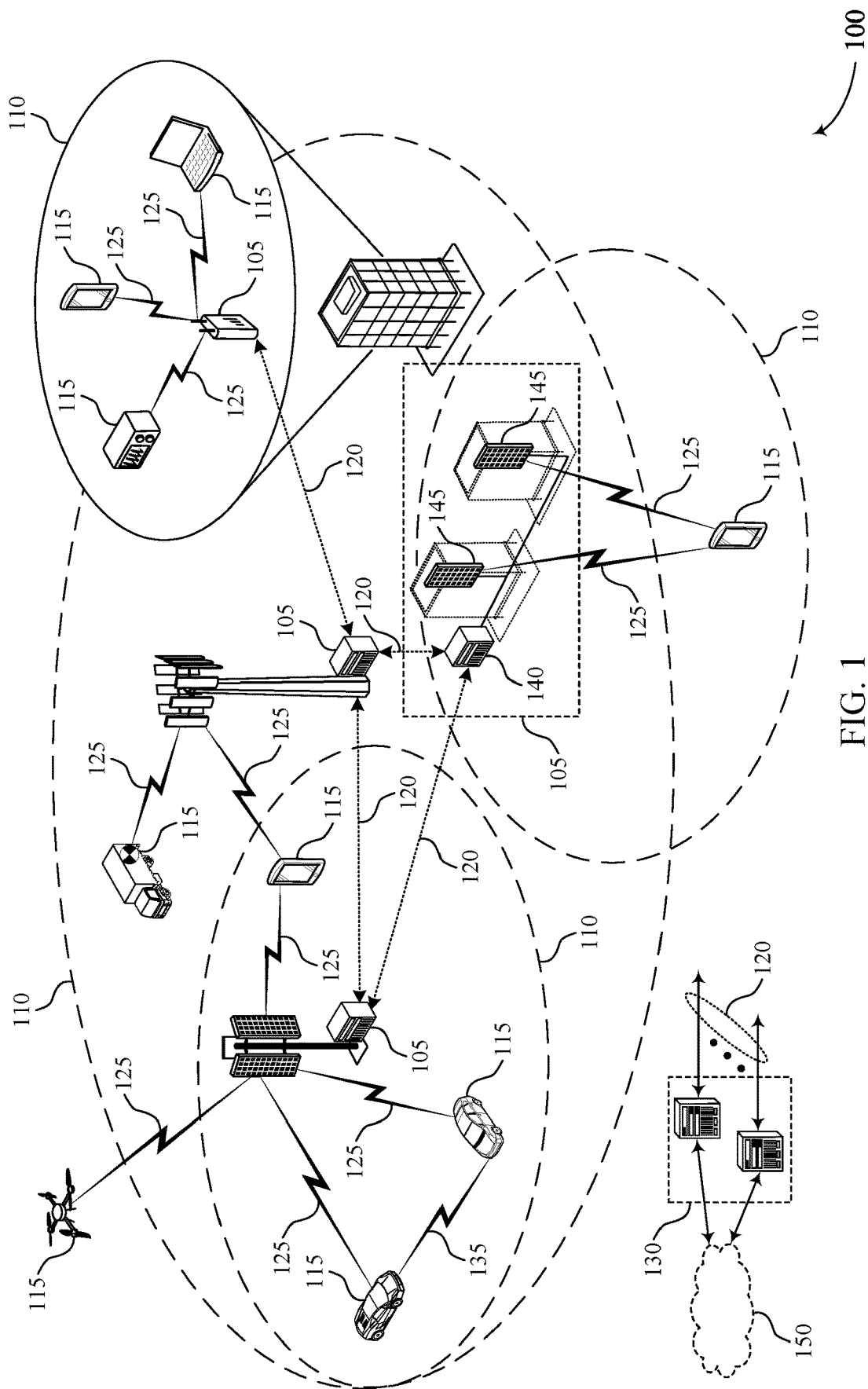
FIG. 1 illustrates an example of a wireless communications system that supports techniques for dynamically applying a repetition factor for a beam in accordance with aspects of the present disclosure.

A user equipment (UE) in a wireless communications system may be configured to transmit repetitions of an uplink control channel message. For example, the UE may be configured to perform physical uplink control channel (PUCCH) repetition and transmit repetitions of uplink control information using multiple PUCCH resources in different slots. Implementing PUCCH repetition may increase reliability for uplink transmissions from the UE. The UE may be configured with a repetition factor, and the UE may transmit the uplink control message in accordance with the repetition factor (e.g., transmitting a number of repetitions corresponding to the repetition factor). In some cases, the UE may be configured with a repetition factor per PUCCH resource set. Resources for the repetitions may be dynamically indicated via a PUCCH resource indication (PRI) in downlink control information that schedules the downlink shared channel transmissions. However, this configuration may correspond only to PUCCH that carries feedback for scheduled downlink shared channel transmissions and not to other uplink control messages.

The present disclosure describes techniques to dynamically indicate a repetition factor which may be applied for multiple uplink control messages. For example, an access network entity, which may include or be an example of a base station, may indicate a dynamic repetition factor to the UE for PUCCH transmissions carrying feedback for a scheduled physical downlink shared channel (PDSCH), and the UE may apply PUCCH repetition to other uplink control messages which are associated with a same transmission configuration indicator (TCI) state based on the dynamic repetition factor. The other uplink control messages may include, for example, uplink control messages for semi-periodically scheduled (SPS) resources or uplink control messages for channel state information (CSI) measurements. If an uplink control message providing feedback for an SPS downlink shared channel transmission is associated with a same TCI state as the uplink control message providing feedback for the scheduled downlink shared channel transmission (which is configured for PUCCH repetition), the UE may also apply PUCCH repetition to the uplink control message providing feedback for the SPS downlink shared channel transmission.

A dynamic repetition factor may be explicitly or implicitly indicated to the UE. For example, the access network entity may indicate the dynamic repetition factor using a PRI bitfield or another bitfield in DCI scheduling the downlink shared channel. In some cases, the dynamic repetition factor may be implicitly indicated by a configuration of a downlink control channel scheduling the downlink shared channel transmission, such as an aggregation level for the downlink control channel or a location of control channel elements in the downlink control channel. In some cases, the UE may determine a second repetition factor to apply for the other uplink control messages based on the dynamic repetition factor. For example, the UE may apply a repetition factor of two for an uplink control message providing feedback for a scheduled downlink shared channel transmission, and the UE may apply a repetition factor of four for an uplink control message associated with periodic CSI. In some cases, the second repetition factor may be included, or configured, with the second control signaling configuring the uplink control message. Some additional techniques for implementing dynamic PUCCH repetition for are described herein.

Aspects of the disclosure are initially described in the context of wireless communications systems. Aspects of the disclosure are further illustrated by and described with reference to apparatus diagrams, system diagrams, and flowcharts that relate to techniques for dynamically applying a repetition factor for a beam.

FIG. 1 illustrates an example of a wireless communications system 100 that supports techniques for dynamically applying a repetition factor for a beam in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for PUCCH repetition. A UE 115 in the wireless communications system 100 may be configured to transmit repetitions of an uplink control channel message (e.g., a PUCCH) message using multiple PUCCH resources in different slots. For example, the UE 115 may receive DCI scheduling a PDSCH data transmission and a PUCCH transmission carrying feedback for the PDSCH data transmission. The UE 115 may be configured to apply PUCCH repetition for the PUCCH transmission, and the DCI may indicate multiple PUCCH resources (e.g., according to a PRI field in the DCI) for the repetitions. Implementing PUCCH repetition may provide coverage enhancement for the UE 115. In some cases, PUCCH repetition may be implemented for demodulation reference signal (DMRS) bundling across PUCCH repetitions.

The UE 115 may be configured with a repetition factor, and the UE 115 may transmit the uplink control message in accordance with the repetition factor (e.g., transmitting a number of repetitions corresponding to the repetition factor). In some cases, the UE 115 may be configured with a repetition factor per PUCCH resource set. In some examples, the UE 115 may receive a dynamic indication of PRI via DCI that schedules PDSCH. However, this configuration may only apply for the PUCCH that carries feedback (e.g., acknowledgment (ACK) or negative ACK (NACK)) feedback for the scheduled PDSCH. Therefore, this configuration may not enable PUCCH repetition for other types of uplink control messages.

The wireless communications system 100 may implement techniques to dynamically indicate a repetition factor which may be applied for different uplink control messages (e.g., different types of uplink control messages). For example, a PUCCH repetition factor indicated for PUCCH carrying ACK for a scheduled PDSCH may be applied to other PUCCH associated with the same TCI state. The PUCCH repetition factor (e.g., a dynamic PUCCH repetition factor) may be explicitly or implicitly indicated to the UE 115. For example, the base station 105 may indicate the dynamic repetition factor using a PRI bitfield or another bitfield in the scheduling DCI for the PDSCH. In some cases, the dynamic repetition factor may be implicitly indicated by the PDCCH scheduling the PDSCH. For example, an aggregation level or location of CCEs in the PDCCH may implicitly indicate the dynamic repetition factor.

In some cases, the dynamic repetition may be applied for the other PUCCH messages until a configuration is updated. For example, the UE 115 may apply PUCCH repetition for the other uplink transmissions while the PUCCH for the scheduled PDSCH and other PUCCH transmissions are associated with a same TCI state or while the other PUCCH transmissions have active configurations. In some cases, the UE may apply PUCCH repetition to the other PUCCH transmissions based on a configuration of a PUCCH resource set indicated by PRI in the scheduling DCI. In some examples, the dynamic repetition may be applied to the other PUCCH transmissions based on a frequency range or subcarrier spacing of resources used to transmit the other PUCCH transmissions.

Figure 2:
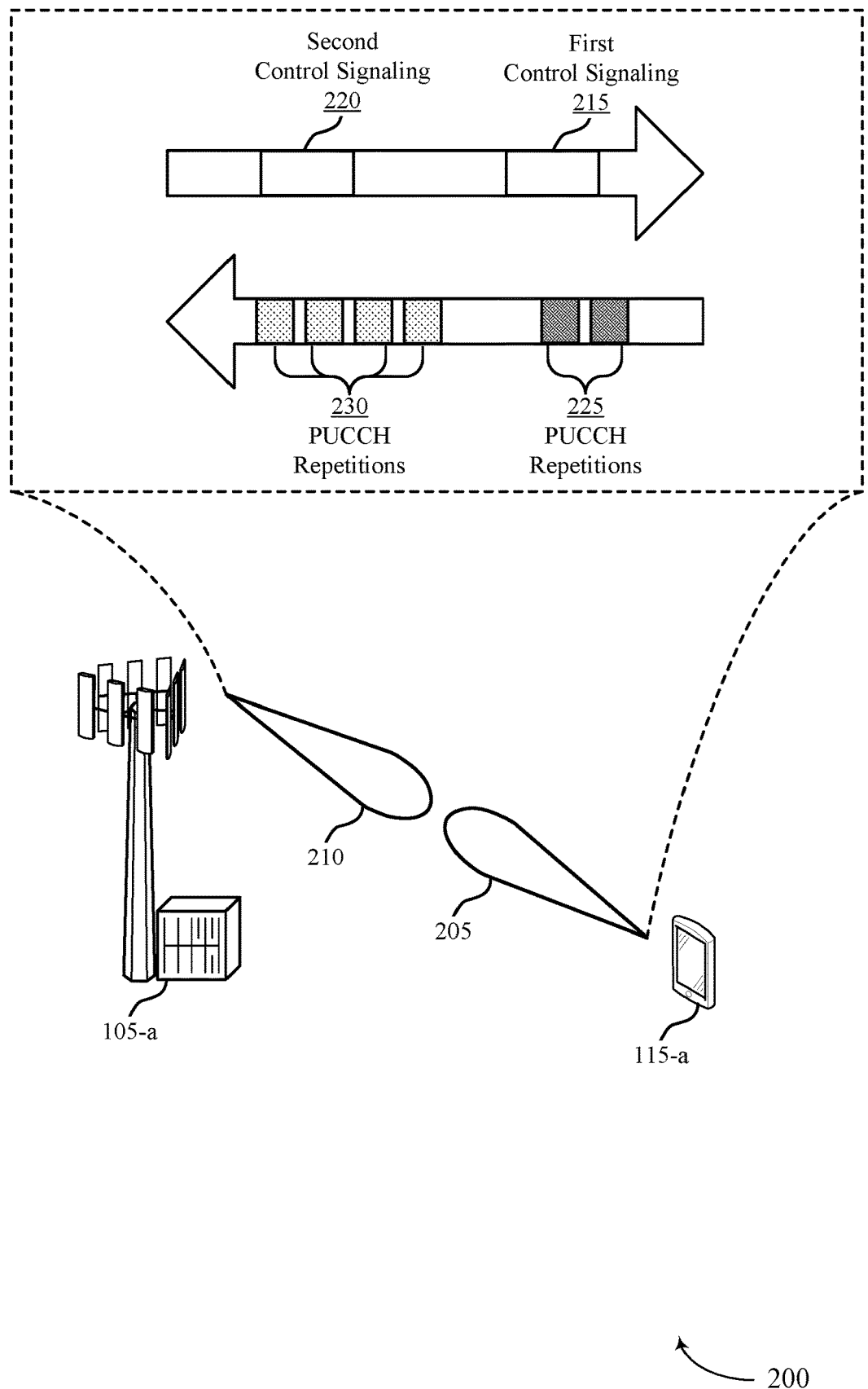
FIG. 2 illustrates an example of a wireless communications system that supports aspects of the present disclosure.

FIG. 2 illustrates an example of a wireless communications system 200 that supports techniques for dynamically applying a repetition factor for a beam in accordance with aspects of the present disclosure. The wireless communications system 200 may be an example of, or implement aspects of, the wireless communications system 100. The wireless communications system 200 may include a UE 115-a and a base station 105-a, which may be respective examples of a UE 115 and a base station 105 as described with reference to FIG. 2. In some examples, the base station 105-*a* may be an example of an access network entity.

The UE 115-*a* and the base station 105-*a* may support beamformed communications. For example, the UE 115-*a* may communicate with the base station 105-*a* using a beam 205, and the base station 105-*a* may communicate with the UE 115-*a* using a beam 210. The beam 210 used to communicate with the UE 115-*a* may be associated with a TCI state. In some cases, different beams at the base station 105-*a* may be associated with different synchronization signal blocks (SSBs) and different TCI states. If the UE 115-*a* moves or changes position, the base station 105-*a* may update a TCI state for the UE 115-*a* to a different beam which points toward the new position of the UE 115-*a*.

The UE 115-*a* may support PUCCH repetition. For example, the UE 115-*a* may be configured to transmit multiple repetitions of an uplink control channel message, which may increase a reliability of uplink signaling or a decoding success at the base station 105-*a*. The UE 115-*a* may be configured with a repetition factor, and the UE 115-*a* may transmit the uplink control message in accordance with the repetition factor (e.g., by transmitting a number of repetitions of the uplink control message corresponding to the repetition factor).

In an example, the UE 115-*a* may receive first control signaling 215 indicating a first repetition factor for transmission of a feedback message associated with a beam. For example, the first control signaling 215 may include DCI which schedules a data transmission (e.g., a PDSCH transmission) for the UE 115-*a*. The DCI may also schedule uplink resources for a feedback message for the data transmission. The first control signaling 215 may indicate the first repetition factor and uplink resources for transmitting repetitions 225 of the feedback message.

In some cases, the base station 105-*a* may explicitly or implicitly indicate the first repetition factor to the UE 115-*a*. For example, the dynamic repetition factor, or the first repetition factor, may be indicated by a PRI bitfield or another bitfield in the DCI scheduling the PDSCH. The UE 115-*a* may decode the DCI scheduling the PDSCH and determine the first repetition factor from a field in the DCI. In some cases, the first repetition factor may be explicitly indicated by the field in the DCI or implicitly indicated. For example, the PRI may indicate multiple uplink resources for uplink feedback, and the UE 115-*a* may determine the first repetition factor from the multiple uplink resources through an implicit indication. In some other examples, a field may explicitly indicate a value for the first repetition factor or an entry to a table of repetition factors configured at the UE 115-*a*.

In some cases, the dynamic repetition factor may be indicated based on a configuration of PDCCH resources carrying the DCI scheduling the PDSCH. For example, the first repetition factor may be implicitly indicated based on an aggregation level of the PDCCH. Additionally, or alternatively, the first repetition factor may be indicated based on a location of CCEs in the PDCCH. For example, a certain configuration or certain CCE locations of the PDCCH may indicate the first repetition factor to the UE 115-*a* and indicate for the UE 115-*a* to transmit the repetitions 225 of the feedback message according to the first repetition factor.

The UE 115-*a* may apply PUCCH repetition for other uplink messages based on the first repetition factor and control signaling for the other uplink messages. For example, the UE 115-*a* may apply PUCCH repetition for uplink control messages carrying feedback for SPS PDSCH, associated with periodic CSI, associated with semi-persistent CSI, associated with a scheduling request, or any combination thereof, among other types of uplink control messages. In some cases, the UE 115-*a* may apply PUCCH repetition for the other uplink messages based on the other uplink messages being associated with a same TCI state (e.g., the same beam) as the feedback message transmitted in the repetitions 225. For example, the base station 105-*a* may use a same TCI state for uplink messages transmitted in the repetitions 225 and the uplink messages transmitted in repetitions 230.

In an example, the UE 115-*a* may receive second control signaling 220 scheduling transmission of a control message associated with the beam. The UE 115-*a* may determine to apply PUCCH repetition to transmit repetitions 230 of the control message based on the control message being associated with the same beam, or same TCI state, as the feedback message. Additionally, or alternatively, the UE 115-*a* may apply PUCCH repetition to transmit the repetitions 230 based on the scheduled PDSCH transmission being associated with a same TCI state as the SPS PDSCH or periodic CSI. For example, the base station 105-*a* may transmit the scheduled PDSCH and an SPS PDSCH using a same TCI state, and the UE 115-*a* may apply PUCCH repetition to transmit feedback for both the scheduled PDSCH and the SPS PDSCH.

In some cases, the UE 115-*a* may transmit the repetitions 225 according to a first repetition factor and may transmit the repetitions 230 according to a second repetition factor. In some cases, the second repetition factor may be different from the first repetition factor. For example, the UE 115-*a* may transmit two repetitions of the feedback message in the repetitions 225, and the UE 115-*a* may transmit four repetitions of the uplink control message in the repetitions 230. In some cases, the UE 115-*a* may determine the second repetition factor based on control signaling for the other uplink control message.

For example, the repetitions 230 may include repetitions of an uplink control message for SPS PDSCH. The base station 105-*a* may configure the SPS PDSCH via control signaling, such as RRC signaling, to schedule the UE 115-*a* for semi-periodic PDSCH resources. In some cases, a configuration for the SPS PDSCH resources may include an indication of the second repetition factor. The UE 115-*a* may determine that the SPS PDSCH is associated with a same TCI state as the scheduled PDSCH or that the feedback message for the SPS PDSCH is associated with the same TCI state as feedback for the scheduled PDSCH, or both, and determine to apply PUCCH repetition for the feedback message for the SPS PDSCH. The UE 115-*a* may determine the second repetition factor based on the first repetition factor or the configuration for the SPS PDSCH, or both, and transmit the repetitions 230 of the uplink control message associated with the SPS PDSCH in accordance with the second repetition factor to the base station 105-*a*.

In some additional, or alternative, examples, the repetitions 230 may include repetitions of an uplink control message for periodic CSI, such as a CSI report, on PUCCH. The base station 105-*a* may configure the periodic CSI via control signaling, such as RRC signaling, to schedule the UE 115-*a* for periodic CSI measurements. In some cases, a configuration for the periodic CSI may include an indication of the second repetition factor. The UE 115-*a* may determine that the periodic CSI is associated with a same TCI state as the scheduled PDSCH or that the uplink control message for the periodic CSI is associated with the same TCI state as feedback for the scheduled PDSCH, or both, and determine to apply PUCCH repetition for the uplink control message associated with the periodic CSI. The UE 115-a may determine the second repetition factor based on the first repetition factor or the configuration for the periodic CSI, or both, and transmit the repetitions 230 of the uplink control message associated with the periodic CSI in accordance with the second repetition factor to the base station 105-a.

In some cases, the second repetition factor may be the same as the first repetition factor. For example, the UE 115-a may be indicated the first repetition factor, and the UE 115-a may apply the first repetition factor for both the feedback message (e.g., to transmit the repetitions 225) and the other uplink control messages (e.g., to transmit the repetitions 230). In some cases, the control signaling for the other uplink control message may indicate to use the same repetition factor as the feedback message.

In some examples, the second control signaling 220 (e.g., for the other control messages) may indicate uplink resources for the repetitions 230. For example, the base station 105-a may configure a number of PUCCH resources for transmitting the repetitions via the second control signaling 220. In some cases, the UE 115-a may determine the second repetition factor based on the configured uplink resources for the repetitions 230. Additionally, or alternatively, the UE 115-a may determine resources for the repetitions 230 based on the first control signaling 215 scheduling the PDSCH transmission. In some cases, the UE 115-a may apply PUCCH repetition for the uplink control message (e.g., the other uplink control messages) in accordance with a rule for applying dynamic repetition to other PUCCH transmissions(s) that use a same beam or have a same TCI state (e.g., always apply a dynamic repetition rule for other PUCCH as set forth in a wireless standard).

In some cases, the UE 115-a may apply PUCCH repetition for the uplink control message (e.g., the other uplink control messages) for a configured time interval. For example, the second control signaling 220 may indicate a duration for applying PUCCH repetition for the uplink control message once PUCCH repetition is activated. The UE 115-a may receive the first control signaling 215 indicating to use PUCCH repetition for the feedback message, which may trigger or activate PUCCH repetition for the other uplink control message(s). The UE 115-a may apply the second repetition factor for the other uplink control message(s) for a duration after the PUCCH repetition is triggered or activated. For example, the timer may span a number of occasions for SPS PDSCH feedback or periodic CSI uplink control message, and the UE 115-a may transmit uplink control messages for the SPS PDSCH or periodic CSI according to corresponding repetition factor while the timer is active. When the timer stops or runs out, the UE 115-a may refrain from applying the corresponding repetition factor to the uplink control messages until PUCCH repetition is triggered or activated again.

Additionally, or alternatively, the UE 115-a may apply the PUCCH repetition for the uplink control message(s) (e.g., the other uplink control messages) until the UE 115-a receives an updated configuration message or is indicated to stop using PUCCH repetition for the uplink control message (s). For example, the base station 105-a may transmit the first control signaling 215, which may trigger or activate PUCCH repetition for the other uplink control messages. The UE 115-a may apply PUCCH repetition to the other uplink control messages until the base station 105-a sends signaling to disable or deactivate PUCCH repetition for the other uplink control messages. In some cases, the signaling to toggle (e.g., activate or deactivate, enable or disable) PUCCH repetition for the other uplink control message may be sent using RRC signaling, a MAC CE, downlink control information, or any combination thereof. For example, the base station 105-a may send DCI signaling scheduling a second PDSCH transmission, and the DCI signaling scheduling the second PDSCH transmission may not include an indication for PUCCH repetition. The UE 115-a may refrain from applying PUCCH repetition for the other uplink control signaling based on receiving the DCI signaling scheduling the second PDSCH transmission.

In some cases, the UE 115-a may determine whether to apply PUCCH repetition for an uplink control message based on a configuration for the uplink control message. For example, the UE 115-a may be configured with two SPS PDSCH configurations. A first SPS PDSCH configuration may be configured to support PUCCH repetition, and a second SPS PDSCH configuration may be configured to not support PUCCH repetition. The UE 115-a may apply PUCCH repetition for uplink control messages associated with the first SPS PDSCH configuration and may not apply PUCCH repetition for uplink control message associated with the second SPS PDSCH configuration. In some cases, PUCCH resources configured for the second SPS PDSCH configuration may not support PUCCH repetition. In some cases, the UE 115-a may determine not to apply PUCCH repetition for some uplink control messages. In an example, the first SPS PDSCH configuration may be associated with a higher priority than the second SPS PDSCH configuration, so the UE 115-a may refrain from applying PUCCH repetition for uplink control messages associated with the second SPS PDSCH configuration, which may provide more resources for uplink control messages associated with the first SPS PDSCH configuration.

In some cases, the UE 115-a may determine whether to apply PUCCH repetition based on the first control signaling 215 (e.g., including DCI scheduling the PDSCH transmission), such as based on a PUCCH resource set indicated by PRI in the first control signaling 215. If an uplink control message is not configured to support PUCCH repetition, such as based on the PUCCH resource set indicated by the first control signaling 215, the UE 115-a may not apply PUCCH repetition for the uplink control message.

In some cases, the UE 115-a may apply PUCCH repetition for an uplink control message based on a frequency range, frequency band, subcarrier spacing (SCS), or any combination thereof, associated with the uplink control message. For example, the UE 115-a may apply PUCCH repetition in some frequency ranges and not apply PUCCH repetition in other frequency ranges. For example, the UE 115-a may only apply PUCCH repetition for uplink control messages transmitted in Frequency Range 2 (FR2), and the UE 115-a may not apply PUCCH repetition for uplink control messages transmitted in Frequency Range 1 (FR1). Additionally, or alternatively, the UE 115-a may apply PUCCH repetition for uplink control messages configured for some SCS and not apply PUCCH repetition for uplink control messages configured for other SCS. For example, the UE 115-a may apply PUCCH repetition for uplink control messages at an SCS of 30 KHz or above and may not apply PUCCH repetition for uplink control messages at an SCS of below 30 KHz. In some cases, the UE 115-a may receive control signaling indicating one or more configurations for one or more SCSs, one or more aggregation levels, one or more control channel elements, one or more frequency bands, one or more frequency ranges, or any combination thereof, in which to apply, or not to apply, PUCCH repetition. For example, the base station 105-*a* may indicate that FR2 supports PUCCH repetition.

In some cases, the UE 115-*a* may apply PUCCH repetition based on a PUCCH format or uplink control information size. For example, the UE 115-*a* may apply PUCCH repetition to transmit the repetitions 230 of the uplink control message if the uplink control message has a configured format or a certain uplink control information size. In some cases, the UE 115-*a* may receive control signaling indicate to apply PUCCH repetition for certain formats or certain uplink control information sizes. For example, the UE 115-*a* may apply PUCCH repetition for uplink control messages under a certain size (e.g., a certain bit size), and the UE 115-*a* may not apply PUCCH repetition for longer uplink control message (e.g., above the bit size).

The UE 115-*a* may transmit the repetitions 230 of the uplink control message according to the second repetition factor to the base station 105-*a*. Transmitting the repetitions 230 according to the second repetition factor may improve a reliability for the uplink control message. As described herein, the UE 115-*a* may implement these techniques for multiple different types of uplink control message. For example, the UE 115-*a* may implement these techniques for uplink control messages associated with SPS PDSCH and uplink control messages associated with periodic CSI. In some cases, the UE 115-*a* may separately transmit repetitions of an uplink control message for the SPS PDSCH and repetitions of an uplink control message for the periodic CSI, in some cases according to different repetition factors. The repetitions of the uplink control message for the SPS PDSCH and the repetitions of the uplink control message for the periodic CSI may have separate uplink resources for transmitting the repetitions (e.g., such that the repetitions do not overlap).

The base station 105-*a* may receive the repetitions 230 of the uplink control message. In some cases, the base station 105-*a* may perform soft combining on the repetitions 230 to obtain the uplink control message. This may increase reliability for transmission of the uplink control message.

Figure 3:
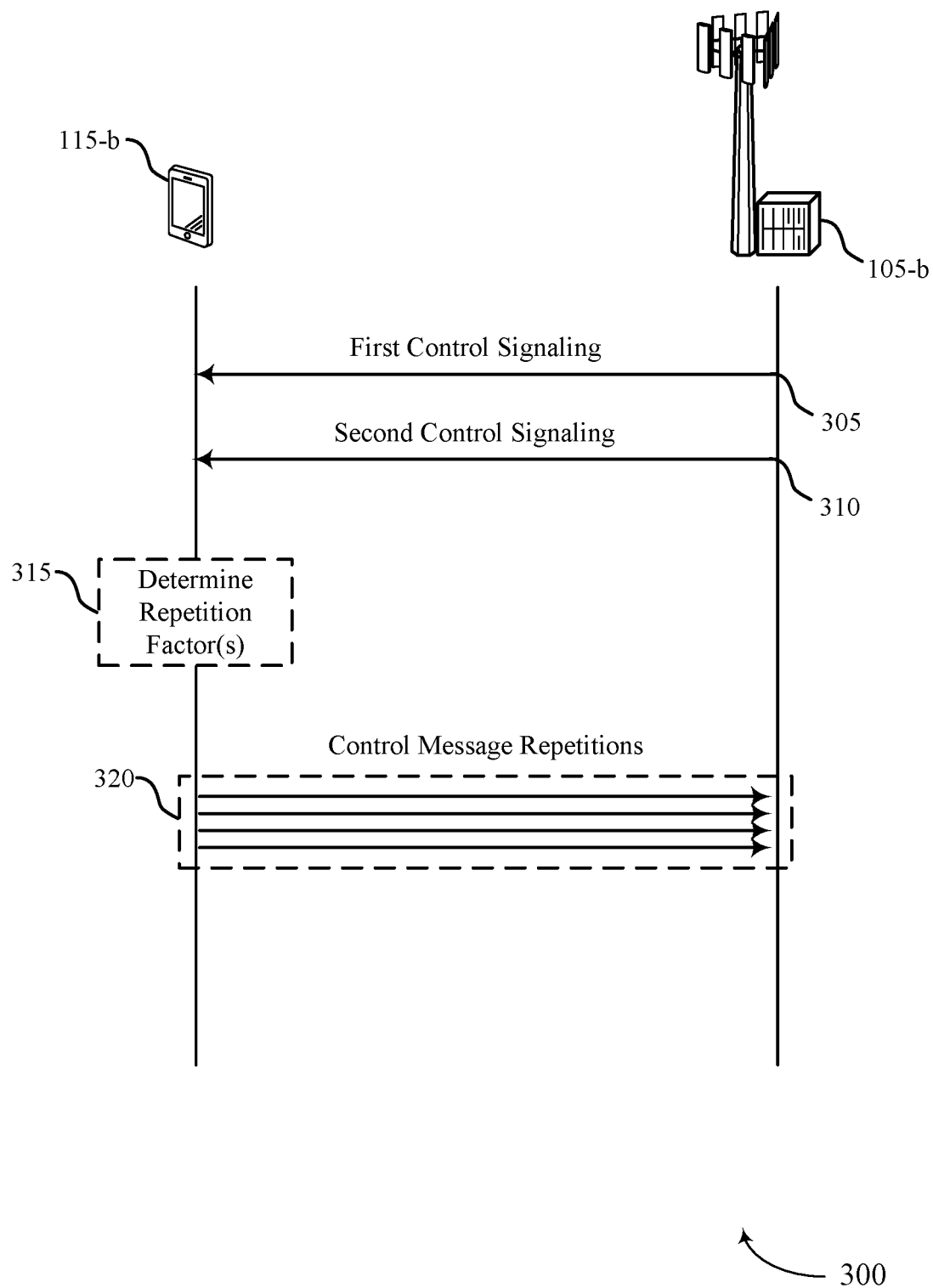
FIG. 3 illustrates an example of a process flow that supports aspects of the present disclosure.

FIG. 3 illustrates an example of a process flow 300 that supports techniques for dynamically applying a repetition factor for a beam in accordance with aspects of the present disclosure. The process flow 300 may be implemented by a UE 115-*b* or a base station 105-*b*, or both, which may be respective examples of a UE 115 and a base station 105 as described with reference to FIGS. 1 and 2. The process flow 300 may implement aspects of a wireless communications system 100 or 200. Some operations or signaling of the process flow 300 may be implemented in a different order than shown by FIG. 3. Additionally, some operations or signaling may be removed, or some operations or signaling may be added.

At 305, the base station 105-*b* may transmit first control signaling indicating a first repetition factor for transmission of a feedback message associated with a beam. The UE 115-*b* may receive the first control signaling message. In some cases, the first control signaling may include DCI scheduling a PDSCH transmission to the UE 115-*b*. The DCI may indicate (e.g., explicitly or implicitly) the first repetition factor, the second repetition factor, or both, to the UE 115-*b*.

At 310, the base station 105-*b* may transmit second control signaling scheduling transmission (e.g., from the UE 115-*b*) of a control message associated with the beam. In some cases, the second control signaling may, for example, configure an SPS PDSCH configuration or a periodic CSI configuration at the UE 115-*b*. In some cases, the second control signaling may configure, at least partially, a second repetition factor associated with the control message.

In some cases, at 315, the UE 115-*b* may determine the second repetition factor associated with the control message. For example, the UE 115-*b* may determine the second repetition factor based on the first repetition factor or the second control signaling or both. In some cases, the UE 115-*b* may determine that PUCCH repetition is enabled or activated for the control message based on the first control signaling indicating the first repetition factor. The UE 115-*b* may determine the second repetition factor from the second control signaling. For example, an SPS PDSCH configuration or a periodic CSI configuration at the UE 115-*b* may include a corresponding repetition factor.

In some cases, the UE 115-*b* may determine to apply PUCCH repetition when transmitting the control message based on the feedback message and the control message being associated with a same beam or TCI state. For example, the feedback message may provide feedback for a PDSCH transmission. In some cases, the control message may be associated with another downlink signal, such as an SPS PDSCH transmission or periodic CSI. In some cases, the UE 115-*b* may determine to apply PUCCH repetition to the control message based on the PDSCH transmission and the other downlink signal being associated with a same TCI state. Additionally, or alternatively, the UE 115-*b* may determine to apply PUCCH repetition to the control message based on the feedback message and the control message being associated with the same TCI state.

At 320, the UE 115-*b* may transmit, in accordance with the second repetition factor, the control message based on the feedback message and the control message being associated with the beam. For example, the control message may include feedback for an SPS PDSCH transmission, and the UE 115-*b* may transmit multiple repetitions of the feedback for the SPS PDSCH transmission in accordance with the second repetition factor. In some cases, the control message may include a periodic CSI report, and the UE 115-*b* may transmit multiple repetitions of the periodic CSI report in accordance with the second repetition factor.

The base station 105-*b* may receive, in accordance with the second repetition factor, the control message based on both the feedback message and the control message being associated with the beam. In some cases, the base station 105-*b* may soft combine the repetitions of the control message to decode the control message.

Figure 4:
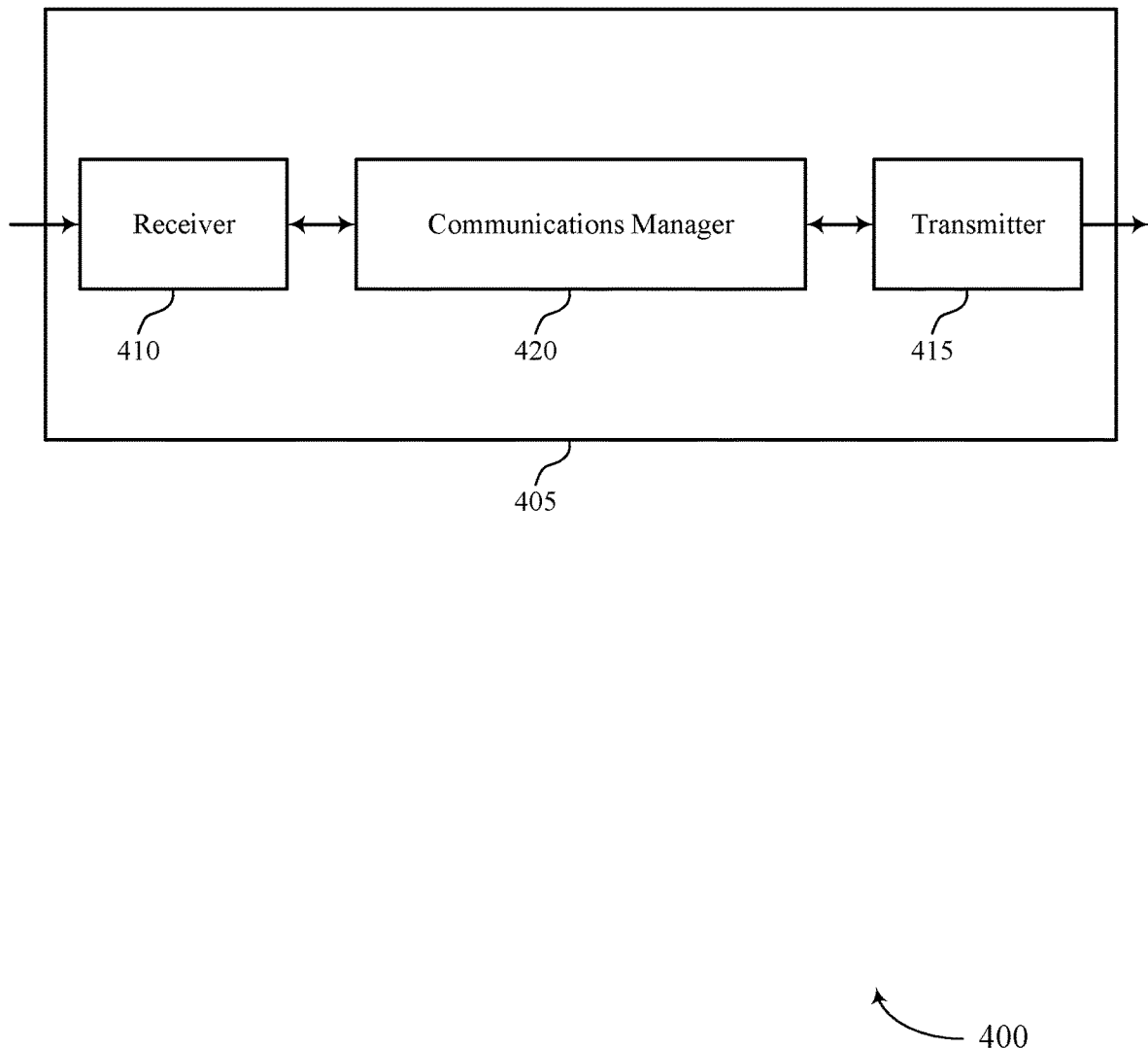
FIGS. 4 and 5 show block diagrams of devices that support aspects of the present disclosure.

FIG. 4 shows a block diagram 400 of a device 405 that supports techniques for dynamically applying a repetition factor for a beam in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for dynamically applying a repetition factor for a beam). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for dynamically applying a repetition factor for a beam). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for dynamically applying a repetition factor for a beam as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving first control signaling indicating a first repetition factor for transmission of a feedback message associated with a beam. The communications manager 420 may be configured as or otherwise support a means for receiving second control signaling scheduling transmission of a control message associated with the beam. The communications manager 420 may be configured as or otherwise support a means for transmitting, in accordance with a second repetition factor, the control message based on both the feedback message and the control message being associated with the beam.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for dynamic indication of a PUCCH repetition factor, which may be used for PUCCH repetition of multiple types of uplink transmissions. For example, indicating a PUCCH repetition factor for an uplink control message carrying PDSCH feedback may be used to enable PUCCH repetition for other uplink control messages, such as uplink control messages carrying periodic CSI reports, SPS PDSCH feedback, scheduling requests, and the like. This may provide increased reliability for uplink transmissions from the UE.

Figure 5:
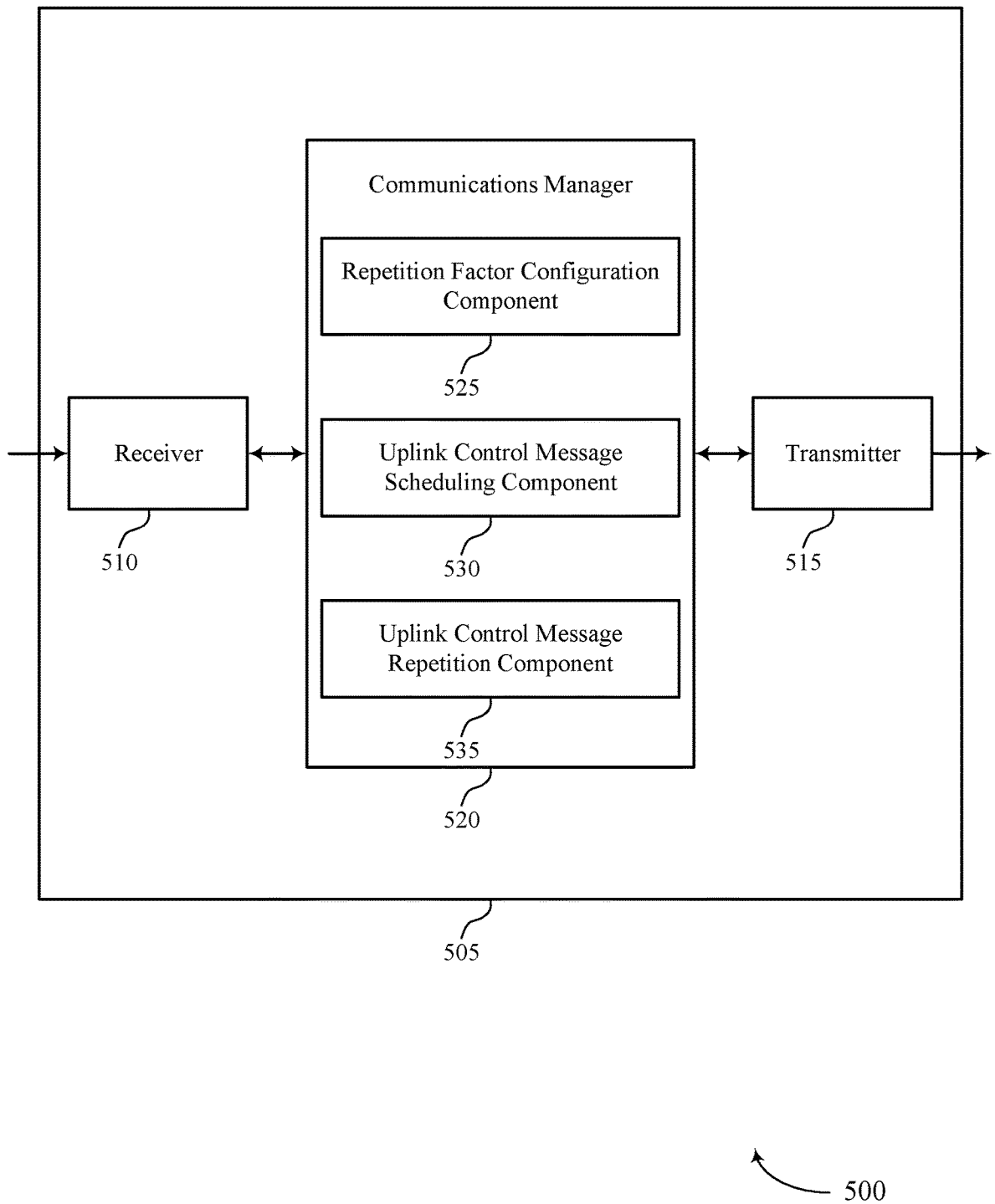

FIG. 5 shows a block diagram 500 of a device 505 that supports techniques for dynamically applying a repetition factor for a beam in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for dynamically applying a repetition factor for a beam). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for dynamically applying a repetition factor for a beam). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for dynamically applying a repetition factor for a beam as described herein. For example, the communications manager 520 may include a repetition factor configuration component 525, an uplink control message scheduling component 530, an uplink control message repetition component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The repetition factor configuration component 525 may be configured as or otherwise support a means for receiving first control signaling indicating a first repetition factor for transmission of a feedback message associated with a beam. The uplink control message scheduling component 530 may be configured as or otherwise support a means for receiving second control signaling scheduling transmission of a control message associated with the beam. The uplink control message repetition component 535 may be configured as or otherwise support a means for transmitting, in accordance with a second repetition factor, the control message based on both the feedback message and the control message being associated with the beam.

Figure 6:
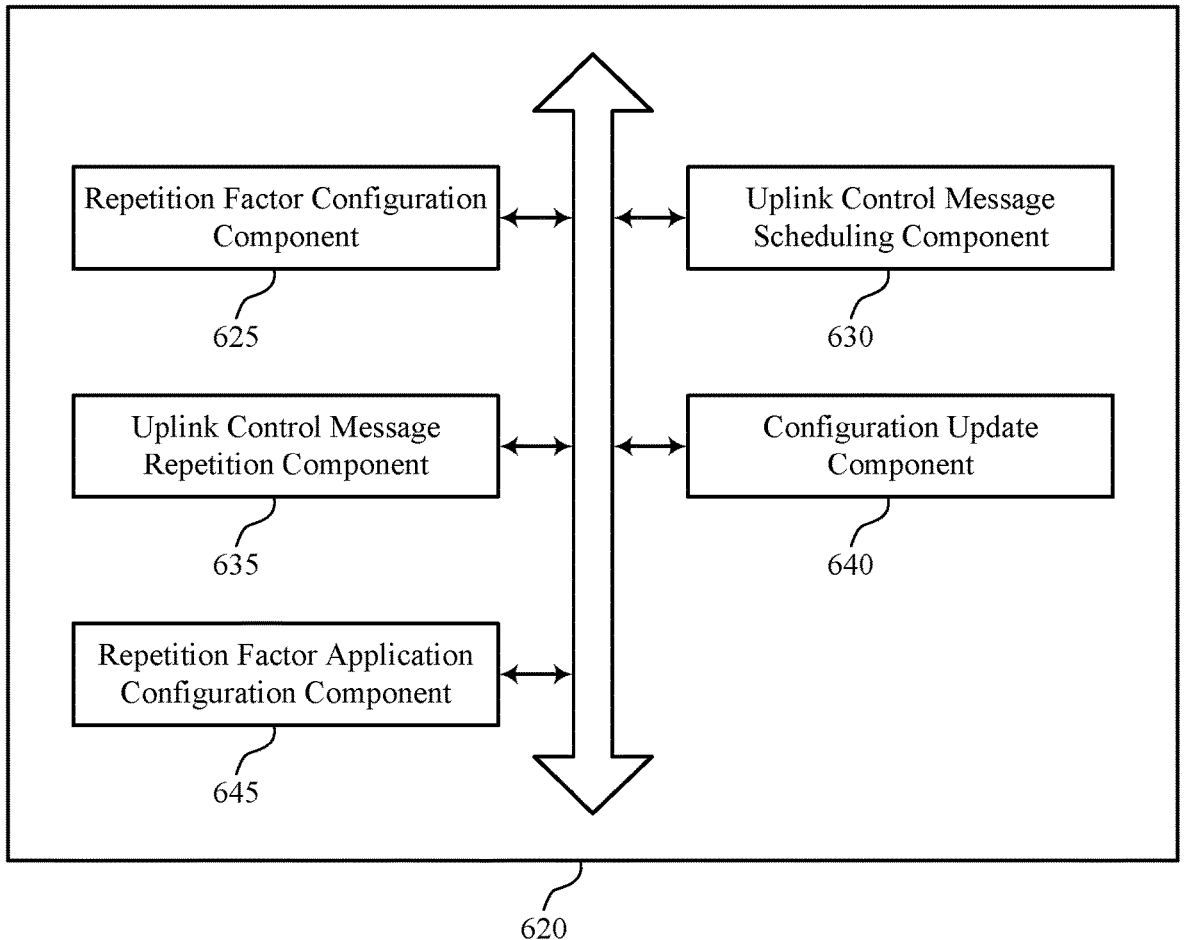
FIG. 6 shows a block diagram of a communications manager that supports aspects of the present disclosure.

FIG. 6 shows a block diagram 600 of a communications manager 620 that supports techniques for dynamically applying a repetition factor for a beam in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for dynamically applying a repetition factor for a beam as described herein. For example, the communications manager 620 may include a repetition factor configuration component 625, an uplink control message scheduling component 630, an uplink control message repetition component 635, a configuration update component 640, a repetition factor application configuration component 645, or any combination thereof. Each of these components may communicate, directly or indirectly, with one another (e.g., via one or more buses).

The communications manager 620 may support wireless communication at a UE in accordance with examples as disclosed herein. The repetition factor configuration component 625 may be configured as or otherwise support a means for receiving first control signaling indicating a first repetition factor for transmission of a feedback message associated with a beam. The uplink control message scheduling component 630 may be configured as or otherwise support a means for receiving second control signaling scheduling transmission of a control message associated with the beam. The uplink control message repetition component 635 may be configured as or otherwise support a means for transmitting, in accordance with a second repetition factor, the control message based on both the feedback message and the control message being associated with the beam.

In some examples, to support receiving the first control signaling, the repetition factor configuration component 625 may be configured as or otherwise support a means for receiving the first control signaling including a bit field indicating the first repetition factor, where the control message is transmitted in accordance with the second repetition factor based on the second control signaling and the bit field indicating the first repetition factor.

In some examples, to support receiving the first control signaling, the repetition factor configuration component 625 may be configured as or otherwise support a means for receiving the first control signaling including a physical uplink control channel resource indicator field indicating the first repetition factor, where the control message is transmitted in accordance with the second repetition factor based on the second control signaling and the physical uplink control channel resource indicator field indicating the first repetition factor.

In some examples, to support transmitting the control message, the uplink control message repetition component 635 may be configured as or otherwise support a means for transmitting the control message in accordance with the second repetition factor based on a configuration indicating to apply the second repetition factor when the first control signaling has a defined aggregation level.

In some examples, to support transmitting the control message, the uplink control message repetition component 635 may be configured as or otherwise support a means for transmitting the control message in accordance with the second repetition factor based on a configuration indicating to apply the second repetition factor when one or more control channel elements associated with the first control signaling correspond to a defined location.

In some examples, to support transmitting the control message, the uplink control message repetition component 635 may be configured as or otherwise support a means for transmitting, in accordance with the second repetition factor, the control message that is a second feedback message associated with semi-persistently scheduled downlink shared channel resources.

In some examples, to support transmitting the control message, the uplink control message repetition component 635 may be configured as or otherwise support a means for transmitting, in accordance with the second repetition factor, the control message that is a periodic CSI report.

In some examples, to support transmitting the control message, the uplink control message repetition component 635 may be configured as or otherwise support a means for transmitting, in accordance with the second repetition factor, the control message based on both the feedback message and the control message being associated with a same TCI state.

In some examples, to support transmitting the control message, the uplink control message repetition component 635 may be configured as or otherwise support a means for transmitting a set of multiple repetitions of the control message on a set of multiple uplink resources corresponding to the second repetition factor.

In some examples, the uplink control message scheduling component 630 may be configured as or otherwise support a means for receiving third control signaling scheduling transmission of a second control message associated with the beam, where the control message and the second control message are different. In some examples, the uplink control message repetition component 635 may be configured as or otherwise support a means for transmitting, in accordance with the second repetition factor, the second control message based on both the feedback message and the second control message being associated with the beam.

In some examples, the configuration update component 640 may be configured as or otherwise support a means for receiving third control signaling indicating the first repetition factor for transmission of a second feedback message associated with a second beam, the second feedback message indicating feedback for a second scheduled downlink data transmission. In some examples, the configuration update component 640 may be configured as or otherwise support a means for receiving fourth control signaling scheduling transmission of a second control message associated with the beam. In some examples, the configuration update component 640 may be configured as or otherwise support a means for transmitting, without applying the second repetition factor, the second control message based on the second feedback message being associated with the second beam and the control message being associated with the beam.

In some examples, the control message is transmitted in accordance with the second repetition factor based on a frequency range or subcarrier spacing, or both, associated with the control message.

In some examples, to support transmitting the control message, the repetition factor application configuration component 645 may be configured as or otherwise support a means for transmitting the control message in accordance with the second repetition factor based on a configuration indicating to apply the second repetition factor when a downlink data channel transmission associated with the feedback message is scheduled for transmission within a time interval.

In some examples, to support transmitting the control message, the repetition factor application configuration component 645 may be configured as or otherwise support a means for transmitting, within a frequency range, the control message in accordance with the second repetition factor based on a configuration indicating to apply the second repetition factor within the frequency range.

In some examples, to support transmitting the control message, the repetition factor application configuration component 645 may be configured as or otherwise support a means for transmitting, using a subcarrier spacing, the control message in accordance with the second repetition factor based on a configuration indicating to apply the second repetition factor for the subcarrier spacing.

In some examples, to support receiving the first control signaling, the uplink control message scheduling component 630 may be configured as or otherwise support a means for receiving the first control signaling including a grant scheduling a scheduled downlink data transmission. In some examples, to support receiving the first control signaling, the uplink control message repetition component 635 may be configured as or otherwise support a means for transmitting, in accordance with the first repetition factor, the feedback message indicating feedback for the scheduled downlink data transmission.

Figure 7:
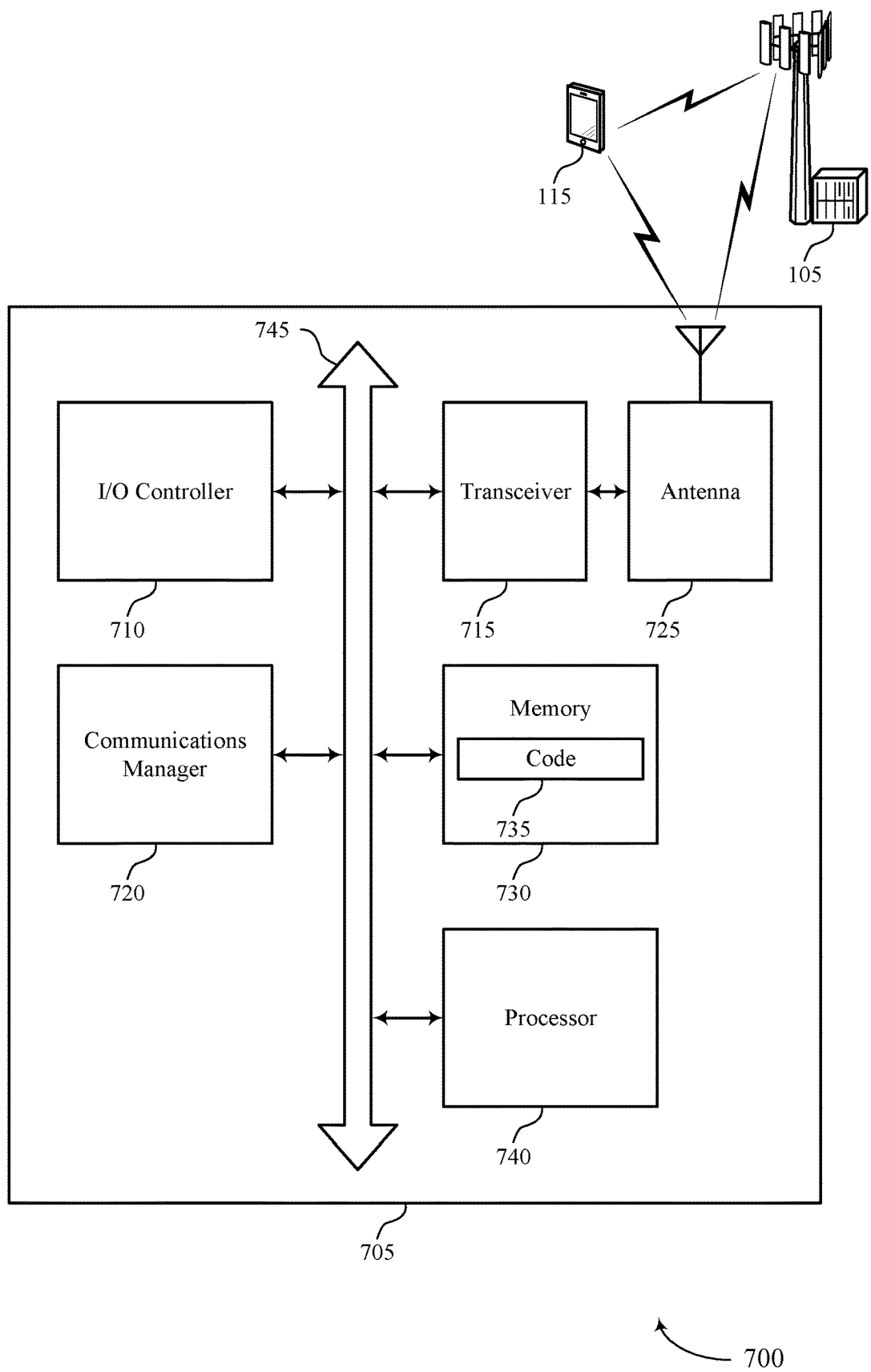
FIG. 7 shows a diagram of a system including a device that supports aspects of the present disclosure.

FIG. 7 shows a diagram of a system 700 including a device 705 that supports techniques for dynamically applying a repetition factor for a beam in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for dynamically applying a repetition factor for a beam). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving first control signaling indicating a first repetition factor for transmission of a feedback message associated with a beam. The communications manager 720 may be configured as or otherwise support a means for receiving second control signaling scheduling transmission of a control message associated with the beam. The communications manager 720 may be configured as or otherwise support a means for transmitting, in accordance with a second repetition factor, the control message based on both the feedback message and the control message being associated with the beam.

By including or configuring the communications manager 720 in accordance with examples as described herein, the device 705 may support techniques for dynamic indication of a PUCCH repetition factor, which may be used for PUCCH repetition of multiple types of uplink transmissions. For example, indicating a PUCCH repetition factor for an uplink control message carrying PDSCH feedback may be used to enable PUCCH repetition for other uplink control messages, such as uplink control messages carrying periodic CSI reports, SPS PDSCH feedback, scheduling requests, and the like. This may provide increased reliability for uplink transmissions from the device 705. This may reduce a number of retransmission attempts at the device 705, which may increase resource efficiency in the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for dynamically applying a repetition factor for a beam as described herein, or the processor 740 and the memory 730 may be otherwise configured to perform or support such operations.

Figure 8:
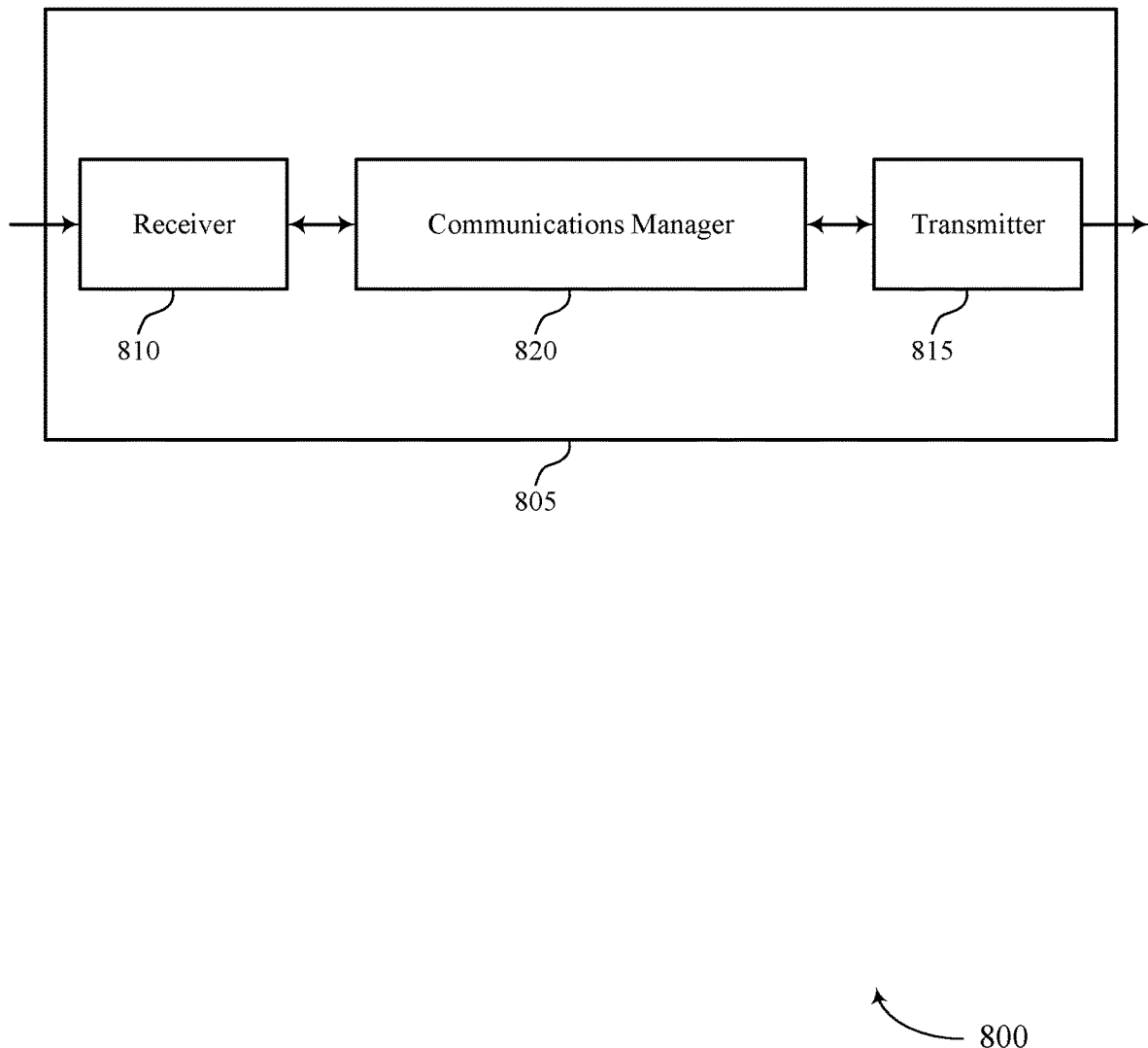
FIGS. 8 and 9 show block diagrams of devices that support aspects of the present disclosure.

FIG. 8 shows a block diagram 800 of a device 805 that supports techniques for dynamically applying a repetition factor for a beam in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamically applying a repetition factor for a beam). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamically applying a repetition factor for a beam). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for dynamically applying a repetition factor for a beam as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting first control signaling indicating a first repetition factor for transmission of a feedback message associated with a beam. The communications manager 820 may be configured as or otherwise support a means for transmitting second control signaling scheduling transmission of a control message associated with the beam. The communications manager 820 may be configured as or otherwise support a means for receiving, in accordance with a second repetition factor, the control message based on both the feedback message and the control message being associated with the beam.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for dynamic indication of a PUCCH repetition factor, which may be used by a UE 115 for PUCCH repetition of multiple types of uplink transmissions. For example, indicating a PUCCH repetition factor for an uplink control message carrying PDSCH feedback may be used to enable PUCCH repetition for other uplink control messages sent by the UE 115, such as uplink control messages carrying periodic CSI reports, SPS PDSCH feedback, scheduling requests, and the like. This may provide increased reliability for uplink transmissions from the UE 115 and an increased likelihood of successful reception and decoding at the device 805.

Figure 9:
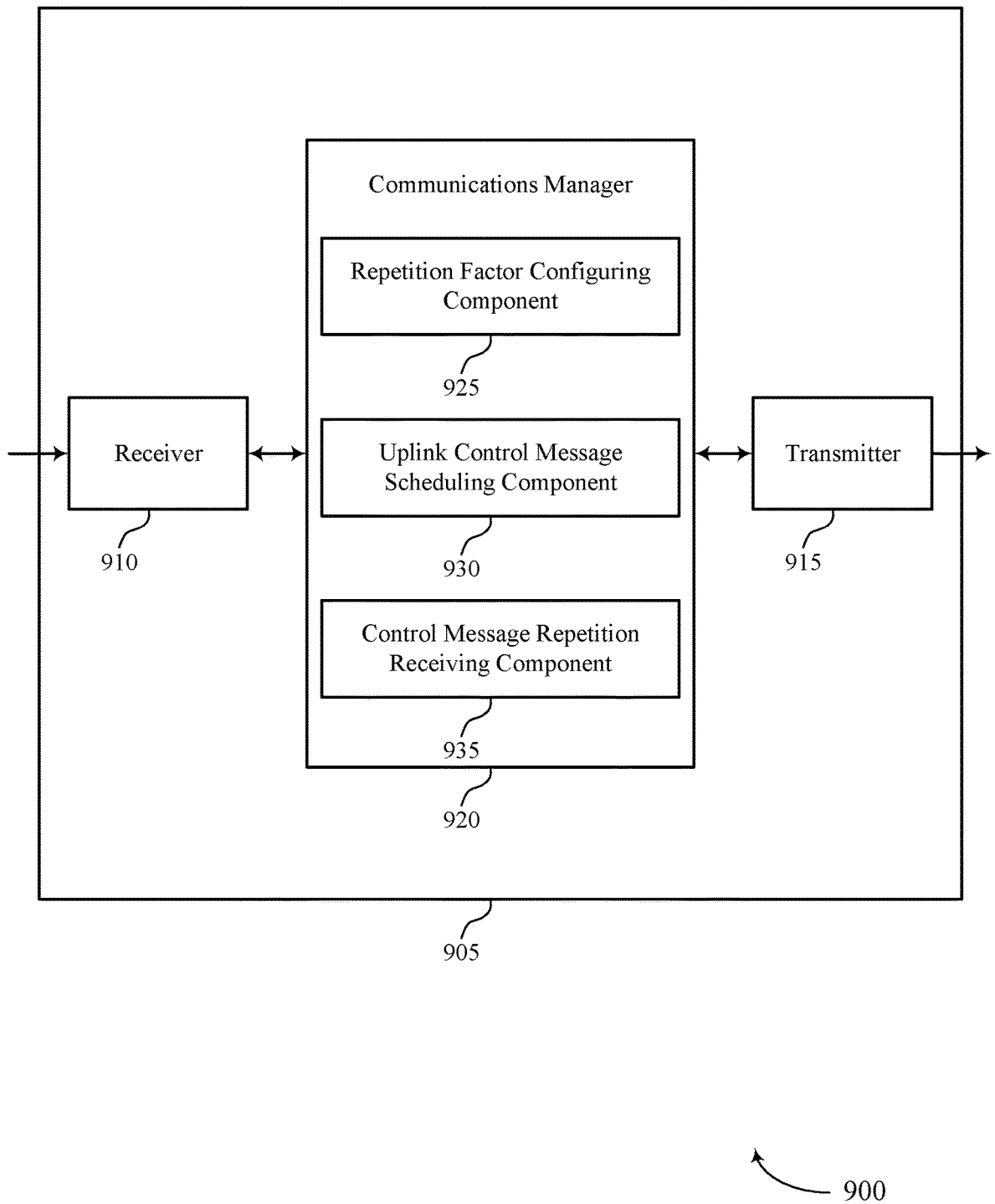

FIG. 9 shows a block diagram 900 of a device 905 that supports techniques for dynamically applying a repetition factor for a beam in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for dynamically applying a repetition factor for a beam). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for dynamically applying a repetition factor for a beam). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for dynamically applying a repetition factor for a beam as described herein. For example, the communications manager 920 may include a repetition factor configuring component 925, an uplink control message scheduling component 930, a control message repetition receiving component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The repetition factor configuring component 925 may be configured as or otherwise support a means for transmitting first control signaling indicating a first repetition factor for transmission of a feedback message associated with a beam. The uplink control message scheduling component 930 may be configured as or otherwise support a means for transmitting second control signaling scheduling transmission of a control message associated with the beam. The control message repetition receiving component 935 may be configured as or otherwise support a means for receiving, in accordance with a second repetition factor, the control message based on both the feedback message and the control message being associated with the beam.

Figure 10:
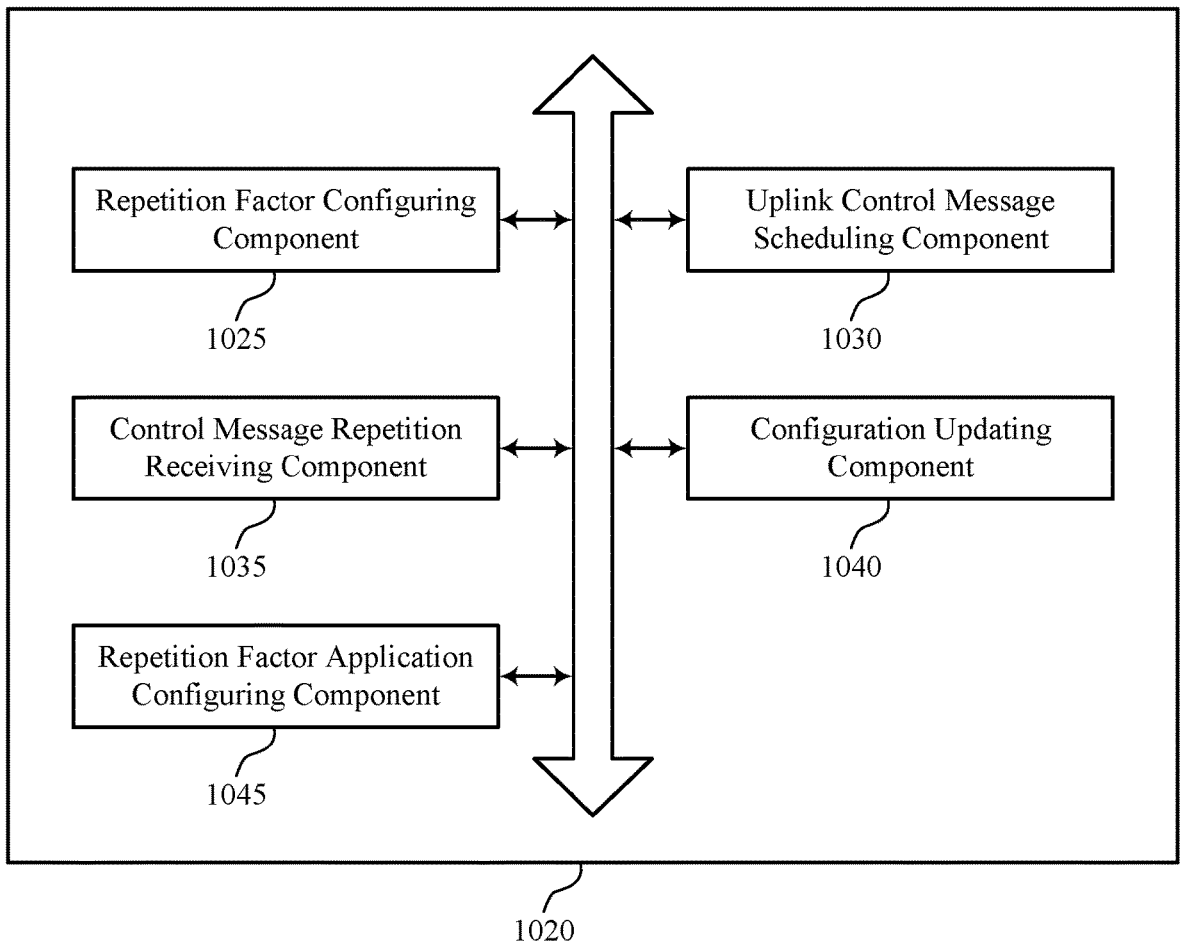
FIG. 10 shows a block diagram of a communications manager that supports aspects of the present disclosure.

FIG. 10 shows a block diagram 1000 of a communications manager 1020 that supports techniques for dynamically applying a repetition factor for a beam in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for dynamically applying a repetition factor for a beam as described herein. For example, the communications manager 1020 may include a repetition factor configuring component 1025, an uplink control message scheduling component 1030, a control message repetition receiving component 1035, a configuration updating component 1040, a repetition factor application configuring component 1045, or any combination thereof. Each of these components may communicate, directly or indirectly, with one another (e.g., via one or more buses).

The communications manager 1020 may support wireless communication at a base station in accordance with examples as disclosed herein. The repetition factor configuring component 1025 may be configured as or otherwise support a means for transmitting first control signaling indicating a first repetition factor for transmission of a feedback message associated with a beam. The uplink control message scheduling component 1030 may be configured as or otherwise support a means for transmitting second control signaling scheduling transmission of a control message associated with the beam. The control message repetition receiving component 1035 may be configured as or otherwise support a means for receiving, in accordance with a second repetition factor, the control message based on both the feedback message and the control message being associated with the beam.

In some examples, to support transmitting the first control signaling, the repetition factor configuring component 1025 may be configured as or otherwise support a means for transmitting the first control signaling including a bit field indicating the first repetition factor, where the control message is received in accordance with the second repetition factor based on the second control signaling and the bit field indicating the first repetition factor.

In some examples, to support transmitting the first control signaling, the repetition factor configuring component 1025 may be configured as or otherwise support a means for transmitting the first control signaling including a physical uplink control channel resource indicator field indicating the first repetition factor, where the control message is received in accordance with the second repetition factor based on the second control signaling and the physical uplink control channel resource indicator field indicating the first repetition factor.

In some examples, to support receiving the control message, the control message repetition receiving component 1035 may be configured as or otherwise support a means for receiving the control message in accordance with the second repetition factor based on a configuration indicating to apply the second repetition factor when the first control signaling has a defined an aggregation level.

In some examples, to support receiving the control message, the control message repetition receiving component 1035 may be configured as or otherwise support a means for receiving the control message in accordance with the second repetition factor based on a configuration indicating to apply the second repetition factor when one or more control channel elements associated with the first control signaling correspond to a defined location.

In some examples, to support receiving the control message, the control message repetition receiving component 1035 may be configured as or otherwise support a means for receiving, in accordance with the second repetition factor, the control message that is a second feedback message associated with semi-persistently scheduled downlink shared channel resources.

In some examples, to support receiving the control message, the control message repetition receiving component 1035 may be configured as or otherwise support a means for receiving, in accordance with the second repetition factor, the control message that is a periodic CSI report.

In some examples, to support receiving the control message, the control message repetition receiving component 1035 may be configured as or otherwise support a means for receiving, in accordance with the second repetition factor, the control message based on both the feedback message and the control message being associated with a same TCI state.

In some examples, to support receiving the control message, the control message repetition receiving component 1035 may be configured as or otherwise support a means for receiving a set of multiple repetitions of the control message on a set of multiple uplink resources corresponding to the second repetition factor.

In some examples, the uplink control message scheduling component 1030 may be configured as or otherwise support a means for transmitting third control signaling scheduling transmission of a second control message associated with the beam, where the control message and the second control message are different. In some examples, the control message repetition receiving component 1035 may be configured as or otherwise support a means for receiving, in accordance with the second repetition factor, the second control message based on both the feedback message and the second control message being associated with the beam.

In some examples, the configuration updating component 1040 may be configured as or otherwise support a means for transmitting third control signaling indicating the first repetition factor for transmission of a second feedback message associated with a second beam, the second feedback message indicating feedback for a second scheduled downlink data transmission. In some examples, the configuration updating component 1040 may be configured as or otherwise support a means for transmitting fourth control signaling scheduling transmission of a second control message associated with the beam. In some examples, the configuration updating component 1040 may be configured as or otherwise support a means for receiving, without the second repetition factor being applied, the second control message based on the second feedback message being associated with the second beam and the control message being associated with the beam.

In some examples, the control message is received in accordance with the second repetition factor based on a frequency range or subcarrier spacing, or both, associated with the control message.

In some examples, to support receiving the control message, the repetition factor application configuring component 1045 may be configured as or otherwise support a means for receiving the control message in accordance with the second repetition factor based on a configuration indicating to the second repetition factor is applied when a downlink data channel transmission associated with the feedback message is scheduled for transmission within a time interval.

In some examples, to support receiving the control message, the repetition factor application configuring component 1045 may be configured as or otherwise support a means for receiving, within a frequency range, the control message in accordance with the second repetition factor based on a configuration indicating the second repetition factor is applied within the frequency range.

In some examples, to support receiving the control message, the repetition factor application configuring component 1045 may be configured as or otherwise support a means for receiving, using a subcarrier spacing, the control message in accordance with the second repetition factor based on a configuration indicating to apply the second repetition factor for the subcarrier spacing.

In some examples, to support transmitting the first control signaling, the uplink control message scheduling component 1030 may be configured as or otherwise support a means for transmitting the first control signaling including a grant scheduling a scheduled downlink data transmission. In some examples, to support transmitting the first control signaling, the control message repetition receiving component 1035 may be configured as or otherwise support a means for receiving, in accordance with the first repetition factor, the feedback message indicating feedback for the scheduled downlink data transmission.

Figure 11:
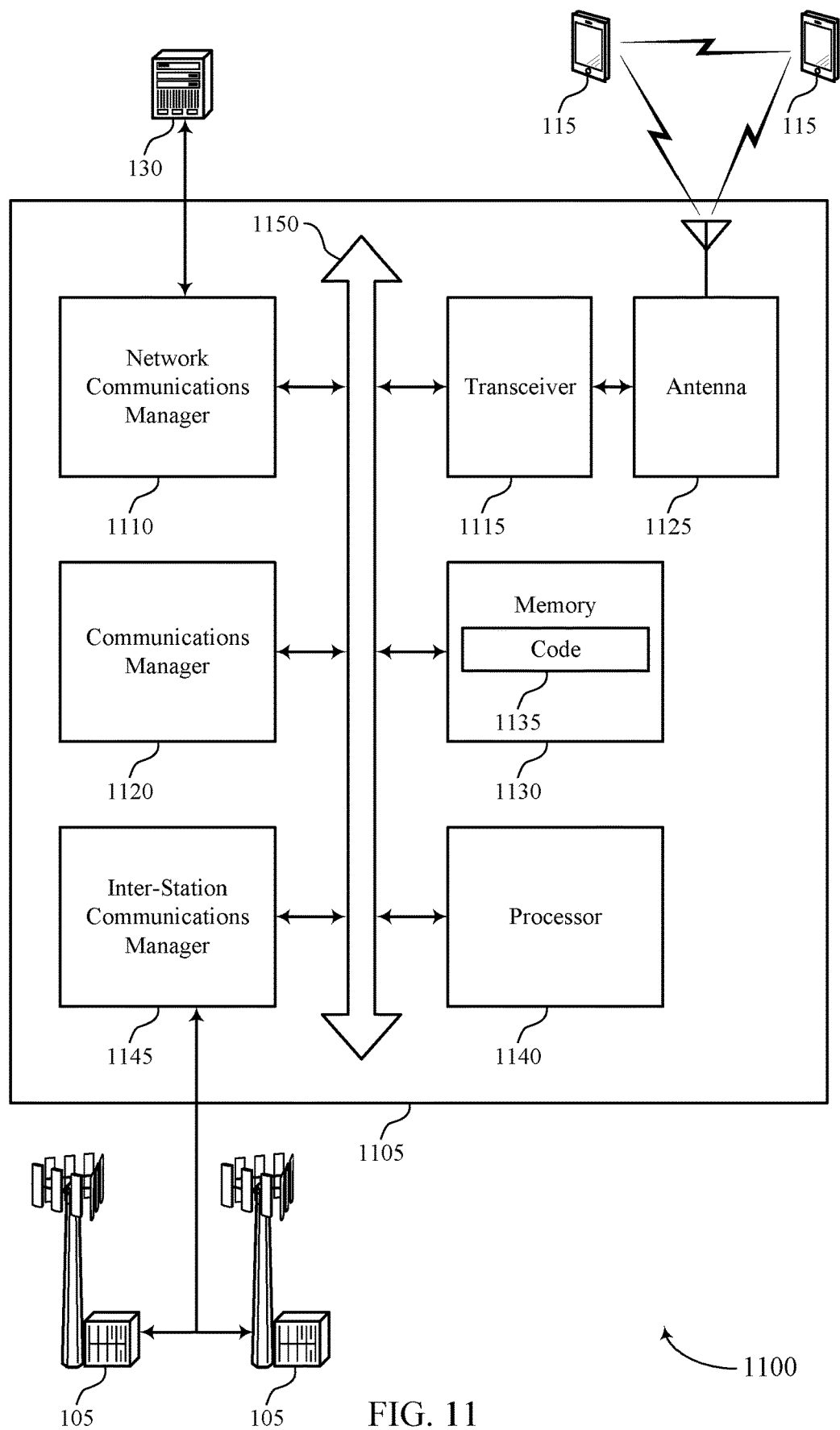
FIG. 11 shows a diagram of a system including a device that supports aspects of the present disclosure.

FIG. 11 shows a diagram of a system 1100 including a device 1105 that supports techniques for dynamically applying a repetition factor for a beam in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for dynamically applying a repetition factor for a beam). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting first control signaling indicating a first repetition factor for transmission of a feedback message associated with a beam. The communications manager 1120 may be configured as or otherwise support a means for transmitting second control signaling scheduling transmission of a control message associated with the beam. The communications manager 1120 may be configured as or otherwise support a means for receiving, in accordance with a second repetition factor, the control message based on both the feedback message and the control message being associated with the beam.

By including or configuring the communications manager 1120 in accordance with examples as described herein, the device 1105 may support techniques for dynamic indication of a PUCCH repetition factor to a UE 115, which may be used for PUCCH repetition of multiple types of uplink transmissions. For example, indicating a PUCCH repetition factor for an uplink control message carrying PDSCH feedback may be used to enable PUCCH repetition at the UE 115 for other uplink control messages, such as uplink control messages carrying periodic CSI reports, SPS PDSCH feedback, scheduling requests, and the like. This may provide increased reliability for uplink transmissions from the UE 115 and an increased likelihood of successful reception and decoding at the device 1105. This may reduce a number of retransmission attempts by the UE 115, and improve resource efficiency in the wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for dynamically applying a repetition factor for a beam as described herein, or the processor 1140 and the memory 1130 may be otherwise configured to perform or support such operations.

Figure 12:
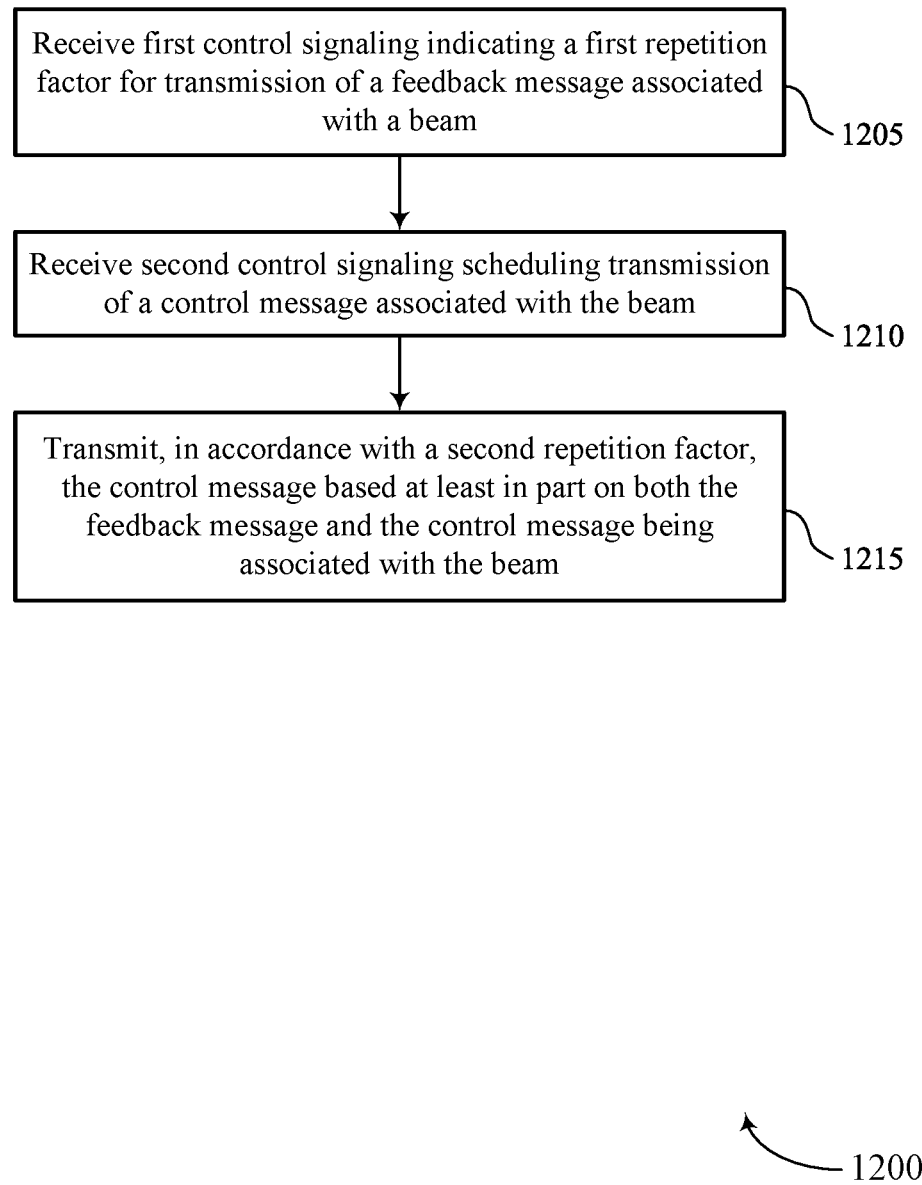
FIGS. 12 through 15 show flowcharts illustrating methods that support aspects of the present disclosure.

FIG. 12 shows a flowchart illustrating a method 1200 that supports techniques for dynamically applying a repetition factor for a beam in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving first control signaling indicating a first repetition factor for transmission of a feedback message associated with a beam. The operations of 1205 may be performed in accordance with examples as disclosed herein. In some examples, aspects of the operations of 1205 may be performed by a repetition factor configuration component 625 as described with reference to FIG. 6.

At 1210, the method may include receiving second control signaling scheduling transmission of a control message associated with the beam. The operations of 1210 may be performed in accordance with examples as disclosed herein. In some examples, aspects of the operations of 1210 may be performed by an uplink control message scheduling component 630 as described with reference to FIG. 6.

At 1215, the method may include transmitting, in accordance with a second repetition factor, the control message based on both the feedback message and the control message being associated with the beam. The operations of 1215 may be performed in accordance with examples as disclosed herein. In some examples, aspects of the operations of 1215 may be performed by an uplink control message repetition component 635 as described with reference to FIG. 6.

Figure 13:
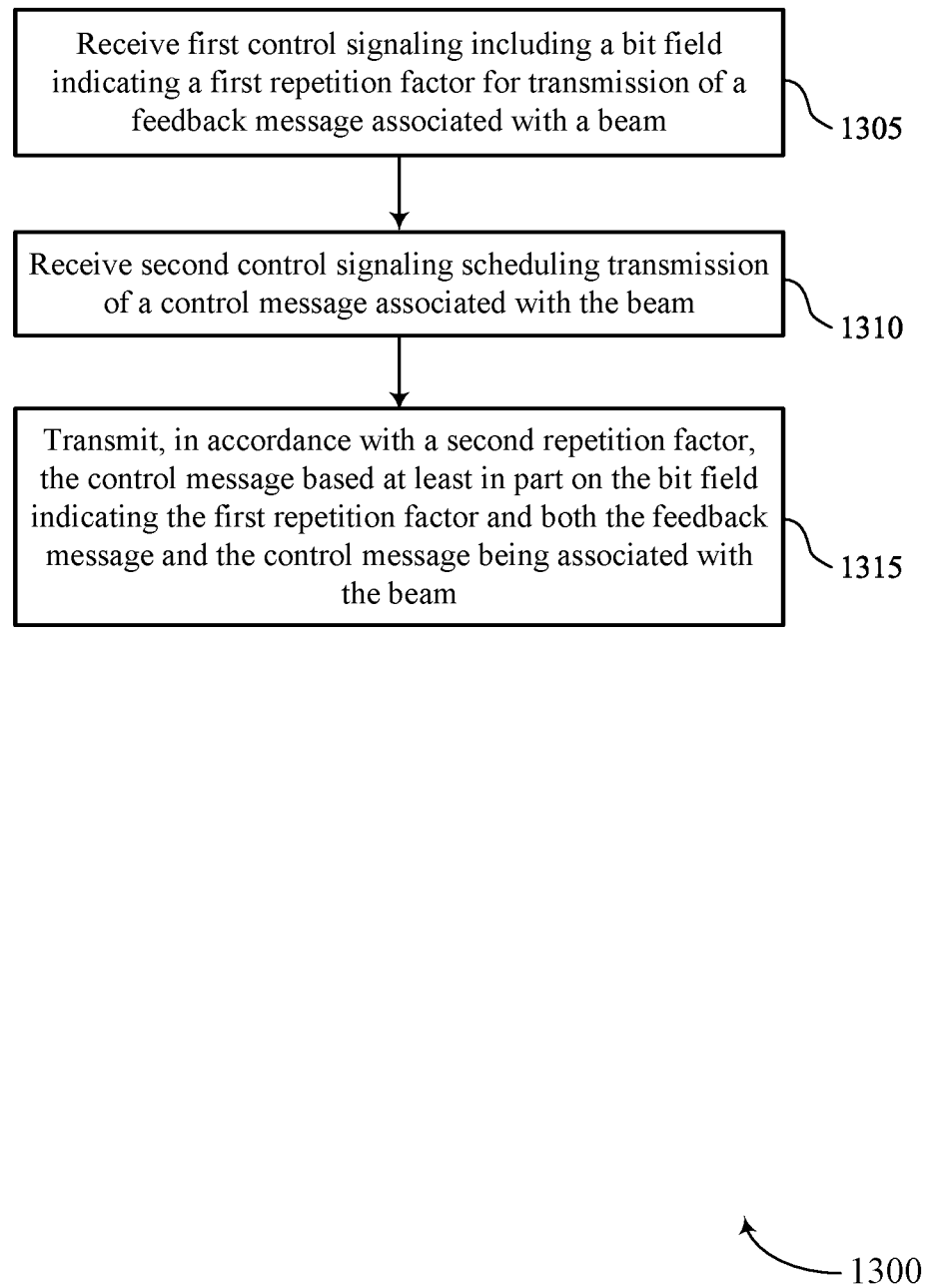

FIG. 13 shows a flowchart illustrating a method 1300 that supports techniques for dynamically applying a repetition factor for a beam in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving first control signaling including a bit field indicating a first repetition factor for transmission of a feedback message associated with a beam. The operations of 1305 may be performed in accordance with examples as disclosed herein. In some examples, aspects of the operations of 1305 may be performed by a repetition factor configuration component 625 as described with reference to FIG. 6.

At 1310, the method may include receiving second control signaling scheduling transmission of a control message associated with the beam. The operations of 1310 may be performed in accordance with examples as disclosed herein. In some examples, aspects of the operations of 1310 may be performed by an uplink control message scheduling component 630 as described with reference to FIG. 6.

At 1315, the method may include transmitting, in accordance with a second repetition factor, the control message based on the bit field indicating the first repetition factor and both the feedback message and the control message being associated with the beam. The operations of 1315 may be performed in accordance with examples as disclosed herein. In some examples, aspects of the operations of 1315 may be performed by an uplink control message repetition component 635 as described with reference to FIG. 6.

Figure 14:
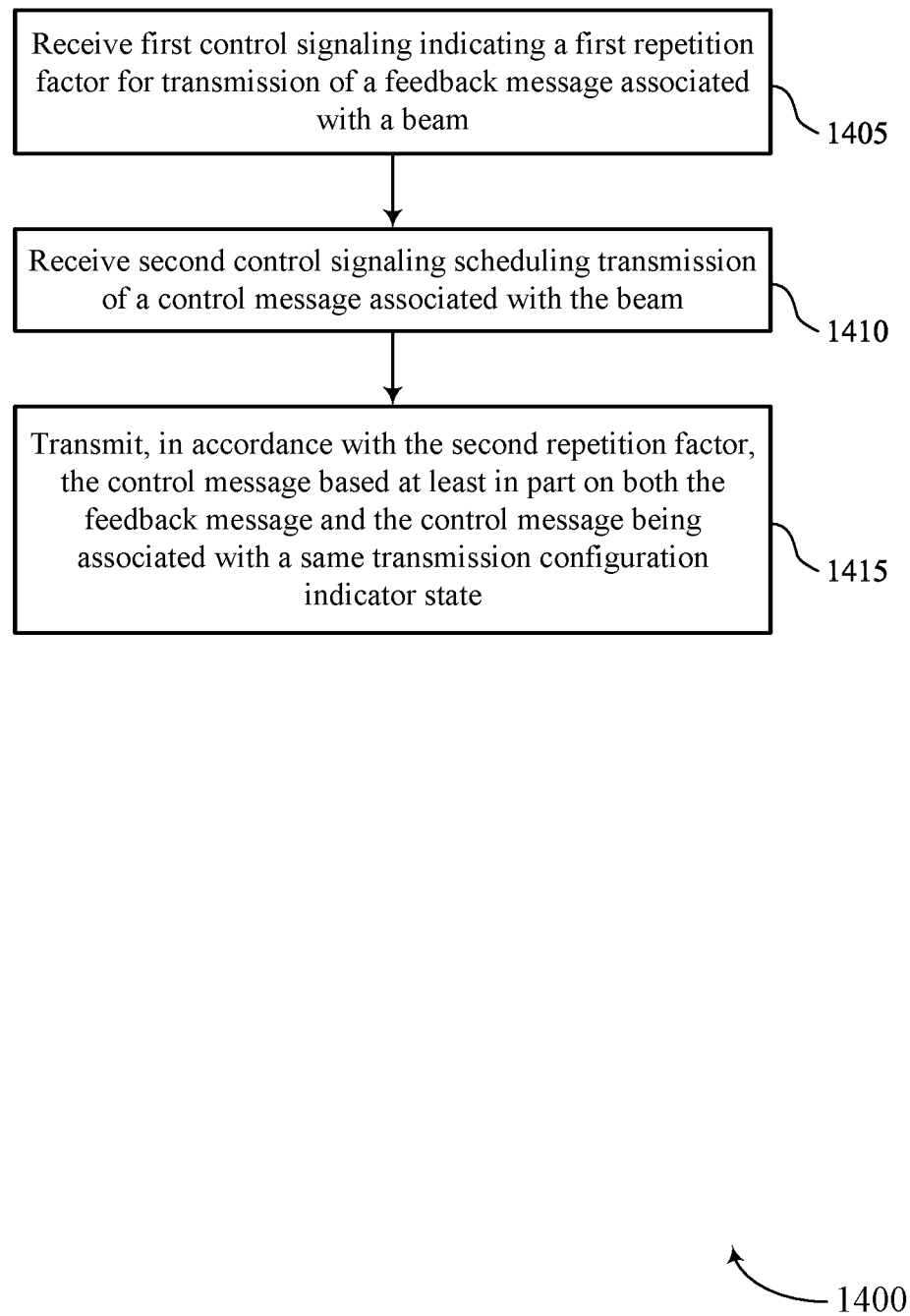

FIG. 14 shows a flowchart illustrating a method 1400 that supports techniques for dynamically applying a repetition factor for a beam in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving first control signaling indicating a first repetition factor for transmission of a feedback message associated with a beam. The operations of 1405 may be performed in accordance with examples as disclosed herein. In some examples, aspects of the operations of 1405 may be performed by a repetition factor configuration component 625 as described with reference to FIG. 6.

At 1410, the method may include receiving second control signaling scheduling transmission of a control message associated with the beam. The operations of 1410 may be performed in accordance with examples as disclosed herein. In some examples, aspects of the operations of 1410 may be performed by an uplink control message scheduling component 630 as described with reference to FIG. 6.

At 1415, the method may include transmitting, in accordance with a second repetition factor, the control message based on both the feedback message and the control message being associated with a same TCI state. The operations of 1415 may be performed in accordance with examples as disclosed herein. In some examples, aspects of the operations of 1415 may be performed by an uplink control message repetition component 635 as described with reference to FIG. 6.

Figure 15:
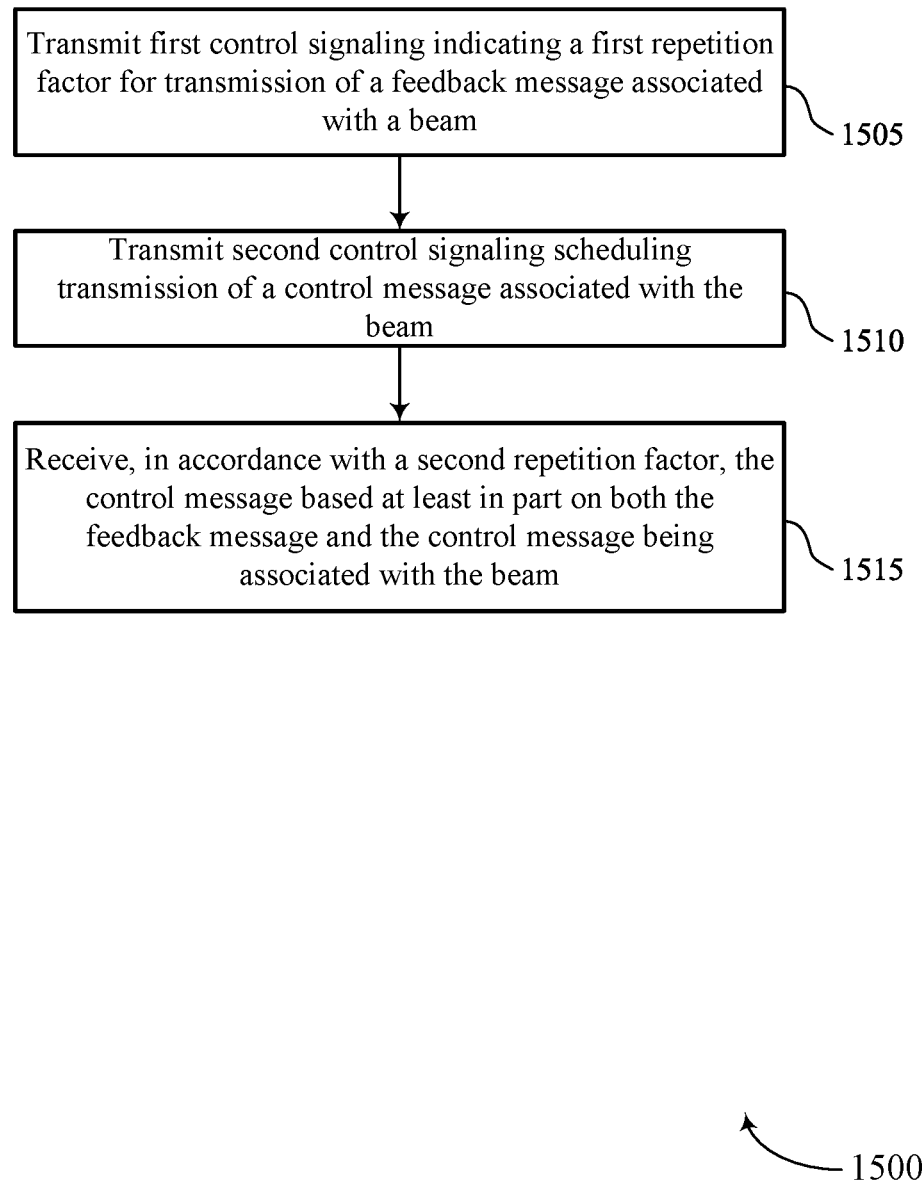

FIG. 15 shows a flowchart illustrating a method 1500 that supports techniques for dynamically applying a repetition factor for a beam in accordance with aspects of the present disclosure. The operations of the method 1500 may be implemented by a base station, or an access network entity, or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting first control signaling indicating a first repetition factor for transmission of a feedback message associated with a beam. The operations of 1505 may be performed in accordance with examples as disclosed herein. In some examples, aspects of the operations of 1505 may be performed by a repetition factor configuring component 1025 as described with reference to FIG. 10.

At 1510, the method may include transmitting second control signaling scheduling transmission of a control message associated with the beam. The operations of 1510 may be performed in accordance with examples as disclosed herein. In some examples, aspects of the operations of 1510 may be performed by an uplink control message scheduling component 1030 as described with reference to FIG. 10.

At 1515, the method may include receiving, in accordance with a second repetition factor, the control message based on both the feedback message and the control message being associated with the beam. The operations of 1515 may be performed in accordance with examples as disclosed herein. In some examples, aspects of the operations of 1515 may be performed by a control message repetition receiving component 1035 as described with reference to FIG. 10.

The following provides an overview of aspects of the present disclosure:

Aspect 1: A method for wireless communication at a UE, comprising: receiving first control signaling indicating a first repetition factor for transmission of a feedback message associated with a beam; receiving second control signaling scheduling transmission of a control message associated with the beam; and transmitting, in accordance with a second repetition factor, the control message based at least in part on both the feedback message and the control message being associated with the beam.

Aspect 2: The method of aspect 1, wherein receiving the first control signaling comprises: receiving the first control signaling including a bit field indicating the first repetition factor, wherein the control message is transmitted in accordance with the second repetition factor based at least in part on the second control signaling and the bit field indicating the first repetition factor.

Aspect 3: The method of any of aspects 1 through 2, wherein receiving the first control signaling comprises: receiving the first control signaling including a physical uplink control channel resource indicator field indicating the first repetition factor, wherein the control message is transmitted in accordance with the second repetition factor based at least in part on the second control signaling and the physical uplink control channel resource indicator field indicating the first repetition factor.

Aspect 4: The method of any of aspects 1 through 3, wherein transmitting the control message comprises: transmitting the control message in accordance with the second repetition factor based at least in part on a configuration indicating to apply the second repetition factor when the first control signaling has a defined aggregation level.

Aspect 5: The method of any of aspects 1 through 4, wherein transmitting the control message comprises: transmitting the control message in accordance with the second repetition factor based at least in part on a configuration indicating to apply the second repetition factor when one or more control channel elements associated with the first control signaling correspond to a defined location.

Aspect 6: The method of any of aspects 1 through 5, wherein transmitting the control message comprises: transmitting, in accordance with the second repetition factor, the control message that is a second feedback message associated with semi-persistently scheduled downlink shared channel resources.

Aspect 7: The method of any of aspects 1 through 6, wherein transmitting the control message comprises: transmitting, in accordance with the second repetition factor, the control message that is a periodic channel state information report.

Aspect 8: The method of any of aspects 1 through 7, wherein transmitting the control message comprises: transmitting, in accordance with the second repetition factor, the control message based at least in part on both the feedback message and the control message being associated with a same transmission configuration indicator state.

Aspect 9: The method of any of aspects 1 through 8, wherein transmitting the control message comprises: transmitting a plurality of repetitions of the control message on a plurality of uplink resources corresponding to the second repetition factor.

Aspect 10: The method of any of aspects 1 through 9, further comprising: receiving third control signaling scheduling transmission of a second control message associated with the beam, wherein the control message and the second control message are different; and transmitting, in accordance with the second repetition factor, the second control message based at least in part on both the feedback message and the second control message being associated with the beam.

Aspect 11: The method of any of aspects 1 through 10, further comprising: receiving third control signaling indicating the first repetition factor for transmission of a second feedback message associated with a second beam, the second feedback message indicating feedback for a second scheduled downlink data transmission; and receiving fourth control signaling scheduling transmission of a second control message associated with the beam; and transmitting, without applying the second repetition factor, the second control message based at least in part on the second feedback message being associated with the second beam and the control message being associated with the beam.

Aspect 12: The method of any of aspects 1 through 11, wherein the control message is transmitted in accordance with the second repetition factor based at least in part on a frequency range or subcarrier spacing, or both, associated with the control message.

Aspect 13: The method of any of aspects 1 through 12, wherein transmitting the control message comprises: transmitting the control message in accordance with the second repetition factor based at least in part on a configuration indicating to apply the second repetition factor when a downlink data channel transmission associated with the feedback message is scheduled for transmission within a time interval.

Aspect 14: The method of any of aspects 1 through 13, wherein transmitting the control message comprises: transmitting, within a frequency range, the control message in accordance with the second repetition factor based at least in part on a configuration indicating to apply the second repetition factor within the frequency range.

Aspect 15: The method of any of aspects 1 through 14, wherein transmitting the control message comprises: transmitting, using a subcarrier spacing, the control message in accordance with the second repetition factor based at least in part on a configuration indicating to apply the second repetition factor for the subcarrier spacing.

Aspect 16: The method of any of aspects 1 through 15, wherein receiving the first control signaling comprises: receiving the first control signaling including a grant scheduling a scheduled downlink data transmission; and transmitting, in accordance with the first repetition factor, the feedback message indicating feedback for the scheduled downlink data transmission.

Aspect 17: A method for wireless communication at a base station, comprising: transmitting first control signaling indicating a first repetition factor for transmission of a feedback message associated with a beam; transmitting second control signaling scheduling transmission of a control message associated with the beam; and receiving, in accordance with a second repetition factor, the control message based at least in part on both the feedback message and the control message being associated with the beam.

Aspect 18: The method of aspect 17, wherein transmitting the first control signaling comprises: transmitting the first control signaling including a bit field indicating the first repetition factor, wherein the control message is received in accordance with the second repetition factor based at least in part on the second control signaling and the bit field indicating the first repetition factor.

Aspect 19: The method of any of aspects 17 through 18, wherein transmitting the first control signaling comprises: transmitting the first control signaling including a physical uplink control channel resource indicator field indicating the first repetition factor, wherein the control message is received in accordance with the second repetition factor based at least in part on the second control signaling and the physical uplink control channel resource indicator field indicating the first repetition factor.

Aspect 20: The method of any of aspects 17 through 19, wherein receiving the control message comprises: receiving the control message in accordance with the second repetition factor based at least in part on a configuration indicating to apply the second repetition factor when the first control signaling has a defined an aggregation level.

Aspect 21: The method of any of aspects 17 through 20, wherein receiving the control message comprises: receiving the control message in accordance with the second repetition factor based at least in part on a configuration indicating to apply the second repetition factor when one or more control channel elements associated with the first control signaling correspond to a defined location.

Aspect 22: The method of any of aspects 17 through 21, wherein receiving the control message comprises: receiving, in accordance with the second repetition factor, the control message that is a second feedback message associated with semi-persistently scheduled downlink shared channel resources.

Aspect 23: The method of any of aspects 17 through 22, wherein receiving the control message comprises: receiving, in accordance with the second repetition factor, the control message that is a periodic channel state information report.

Aspect 24: The method of any of aspects 17 through 23, wherein receiving the control message comprises: receiving, in accordance with the second repetition factor, the control message based at least in part on both the feedback message and the control message being associated with a same transmission configuration indicator state.

Aspect 25: The method of any of aspects 17 through 24, wherein receiving the control message comprises: receiving a plurality of repetitions of the control message on a plurality of uplink resources corresponding to the second repetition factor.

Aspect 26: The method of any of aspects 17 through 25, further comprising: transmitting third control signaling scheduling transmission of a second control message associated with the beam, wherein the control message and the second control message are different; and receiving, in accordance with the second repetition factor, the second control message based at least in part on both the feedback message and the second control message being associated with the beam.

Aspect 27: The method of any of aspects 17 through 26, further comprising: transmitting third control signaling indicating the first repetition factor for transmission of a second feedback message associated with a second beam, the second feedback message indicating feedback for a second scheduled downlink data transmission; and transmitting fourth control signaling scheduling transmission of a second control message associated with the beam; and receiving, without the second repetition factor being applied, the second control message based at least in part on the second feedback message being associated with the second beam and the control message being associated with the beam.

Aspect 28: The method of any of aspects 17 through 27, wherein the control message is received in accordance with the second repetition factor based at least in part on a frequency range or subcarrier spacing, or both, associated with the control message.

Aspect 29: The method of any of aspects 17 through 28, wherein receiving the control message comprises: receiving the control message in accordance with the second repetition factor based at least in part on a configuration indicating to the second repetition factor is applied when a downlink data channel transmission associated with the feedback message is scheduled for transmission within a time interval.

Aspect 30: The method of any of aspects 17 through 29, wherein receiving the control message comprises: receiving, within a frequency range, the control message in accordance with the second repetition factor based at least in part on a configuration indicating the second repetition factor is applied within the frequency range.

Aspect 31: The method of any of aspects 17 through 30, wherein receiving the control message comprises: receiving, using a subcarrier spacing, the control message in accordance with the second repetition factor based at least in part on a configuration indicating to apply the second repetition factor for the subcarrier spacing.

Aspect 32: The method of any of aspects 17 through 31, wherein transmitting the first control signaling comprises: transmitting the first control signaling including a grant scheduling a scheduled downlink data transmission; and receiving, in accordance with the first repetition factor, the feedback message indicating feedback for the scheduled downlink data transmission.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communication at a base station, comprising a processor; memory coupled with the processor; and instructions stored in the memory and executable by the processor to cause the apparatus to perform a method of any of aspects 17 through 32.

Aspect 37: An apparatus for wireless communication at a base station, comprising at least one means for performing a method of any of aspects 17 through 32.

Aspect 38: A non-transitory computer-readable medium storing code for wireless communication at a base station, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving first control signaling indicating a first repetition factor for transmission of a feedback message associated with a beam;
   receiving second control signaling scheduling transmission of a control message associated with the beam; and
   transmitting, in accordance with a second repetition factor, the control message based at least in part on both the feedback message and the control message being associated with the beam.

2. The method of claim 1, wherein receiving the first control signaling comprises:
   receiving the first control signaling including a bit field indicating the first repetition factor, wherein the control message is transmitted in accordance with the second repetition factor based at least in part on the second control signaling and the bit field indicating the first repetition factor.

3. The method of claim 1, wherein receiving the first control signaling comprises:
   receiving the first control signaling including a physical uplink control channel resource indicator field indicating the first repetition factor, wherein the control message is transmitted in accordance with the second repetition factor based at least in part on the second control signaling and the physical uplink control channel resource indicator field indicating the first repetition factor.

4. The method of claim 1, wherein transmitting the control message comprises:
   transmitting the control message in accordance with the second repetition factor based at least in part on a configuration indicating to apply the second repetition factor when the first control signaling has a defined aggregation level.

5. The method of claim 1, wherein transmitting the control message comprises:
transmitting the control message in accordance with the second repetition factor based at least in part on a configuration indicating to apply the second repetition factor when one or more control channel elements associated with the first control signaling correspond to a defined location.

6. The method of claim 1, wherein transmitting the control message comprises:
transmitting, in accordance with the second repetition factor, the control message that is a second feedback message associated with semi-persistently scheduled downlink shared channel resources.

7. The method of claim 1, wherein transmitting the control message comprises:
transmitting, in accordance with the second repetition factor, the control message that is a periodic channel state information report.

8. The method of claim 1, wherein transmitting the control message comprises:
transmitting, in accordance with the second repetition factor, the control message based at least in part on both the feedback message and the control message being associated with a same transmission configuration indicator state.

9. The method of claim 1, wherein transmitting the control message comprises:
transmitting a plurality of repetitions of the control message on a plurality of uplink resources corresponding to the second repetition factor.

10. The method of claim 1, further comprising:
receiving third control signaling scheduling transmission of a second control message associated with the beam, wherein the control message and the second control message are different; and
transmitting, in accordance with the second repetition factor, the second control message based at least in part on both the feedback message and the second control message being associated with the beam.

11. The method of claim 1, further comprising:
receiving third control signaling indicating the first repetition factor for transmission of a second feedback message associated with a second beam, the second feedback message indicating feedback for a second scheduled downlink data transmission;
receiving fourth control signaling scheduling transmission of a second control message associated with the beam; and
transmitting, without applying the second repetition factor, the second control message based at least in part on the second feedback message being associated with the second beam and the control message being associated with the beam.

12. The method of claim 1, wherein the control message is transmitted in accordance with the second repetition factor based at least in part on a frequency range or subcarrier spacing, or both, associated with the control message.

13. The method of claim 1, wherein transmitting the control message comprises:
transmitting the control message in accordance with the second repetition factor based at least in part on a configuration indicating to apply the second repetition factor when a downlink data channel transmission associated with the feedback message is scheduled for transmission within a time interval.

14. The method of claim 1, wherein transmitting the control message comprises:
transmitting, within a frequency range, the control message in accordance with the second repetition factor based at least in part on a configuration indicating to apply the second repetition factor within the frequency range.

15. The method of claim 1, wherein transmitting the control message comprises:
transmitting, using a subcarrier spacing, the control message in accordance with the second repetition factor based at least in part on a configuration indicating to apply the second repetition factor for the subcarrier spacing.

16. The method of claim 1, wherein receiving the first control signaling comprises:
receiving the first control signaling including a grant scheduling a scheduled downlink data transmission; and
transmitting, in accordance with the first repetition factor, the feedback message indicating feedback for the scheduled downlink data transmission.

17. A method for wireless communication at an access network entity, comprising:
transmitting first control signaling indicating a first repetition factor for transmission of a feedback message associated with a beam;
transmitting second control signaling scheduling transmission of a control message associated with the beam; and
receiving, in accordance with a second repetition factor, the control message based at least in part on both the feedback message and the control message being associated with the beam.

18. The method of claim 17, wherein transmitting the first control signaling comprises:
transmitting the first control signaling including a bit field indicating the first repetition factor, wherein the control message is received in accordance with the second repetition factor based at least in part on the second control signaling and the bit field indicating the first repetition factor.

19. The method of claim 17, wherein transmitting the first control signaling comprises:
transmitting the first control signaling including a physical uplink control channel resource indicator field indicating the first repetition factor, wherein the control message is received in accordance with the second repetition factor based at least in part on the second control signaling and the physical uplink control channel resource indicator field indicating the first repetition factor.

20. The method of claim 17, wherein receiving the control message comprises:
receiving the control message in accordance with the second repetition factor based at least in part on a configuration indicating to apply the second repetition factor when the first control signaling has a defined an aggregation level.

21. The method of claim 17, wherein receiving the control message comprises:
receiving the control message in accordance with the second repetition factor based at least in part on a configuration indicating to apply the second repetition factor when one or more control channel elements associated with the first control signaling correspond to a defined location.

22. The method of claim 17, wherein receiving the control message comprises:
receiving, in accordance with the second repetition factor, the control message that is a second feedback message associated with semi-persistently scheduled downlink shared channel resources.

23. The method of claim 17, wherein receiving the control message comprises:
receiving, in accordance with the second repetition factor, the control message that is a periodic channel state information report.

24. The method of claim 17, wherein receiving the control message comprises:
receiving, in accordance with the second repetition factor, the control message based at least in part on both the feedback message and the control message being associated with a same transmission configuration indicator state.

25. The method of claim 17, wherein receiving the control message comprises:
receiving a plurality of repetitions of the control message on a plurality of uplink resources corresponding to the second repetition factor.

26. The method of claim 17, further comprising:
transmitting third control signaling scheduling transmission of a second control message associated with the beam, wherein the control message and the second control message are different; and
receiving, in accordance with the second repetition factor, the second control message based at least in part on both the feedback message and the second control message being associated with the beam.

27. The method of claim 17, further comprising:
transmitting third control signaling indicating the first repetition factor for transmission of a second feedback message associated with a second beam, the second feedback message indicating feedback for a second scheduled downlink data transmission;
transmitting fourth control signaling scheduling transmission of a second control message associated with the beam; and
receiving, without the second repetition factor being applied, the second control message based at least in part on the second feedback message being associated with the second beam and the control message being associated with the beam.

28. The method of claim 17, wherein the control message is received in accordance with the second repetition factor based at least in part on a frequency range or subcarrier spacing, or both, associated with the control message.

29. An apparatus for wireless communication at a user equipment (UE), comprising:
a transceiver;
a processor;
memory coupled with the processor; and
instructions stored in the memory and executable by the processor to cause the apparatus to:
receive, via the transceiver, first control signaling indicating a first repetition factor for transmission of a feedback message associated with a beam;
receive second control signaling scheduling transmission of a control message associated with the beam; and
transmit, in accordance with a second repetition factor, the control message based at least in part on both the feedback message and the control message being associated with the beam.

30. An apparatus for wireless communication at an access network entity, comprising:
a transceiver;
a processor;
memory coupled with the processor; and
instructions stored in the memory and executable by the processor to cause the apparatus to:
transmit, via the transceiver, first control signaling indicating a first repetition factor for transmission of a feedback message associated with a beam;
transmit second control signaling scheduling transmission of a control message associated with the beam; and
receive, in accordance with a second repetition factor, the control message based at least in part on both the feedback message and the control message being associated with the beam.

* * * * *